(12) United States Patent
Belimpasakis et al.

(10) Patent No.: US 9,471,934 B2
(45) Date of Patent: Oct. 18, 2016

(54) METHOD AND APPARATUS FOR FEATURE-BASED PRESENTATION OF CONTENT

(75) Inventors: Petros Belimpasakis, Tampere (FI); Jussi Severi Uusitalo, Hämeenlinna (FI); Timo Pekka Pylvänäinen, Palo Alto, CA (US); Kimmo Tapio Roimela, Tampere (FI); Juha Henrik Arrasvuori, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 791 days.

(21) Appl. No.: 13/073,485

(22) Filed: Mar. 28, 2011

(65) Prior Publication Data

US 2012/0218296 A1 Aug. 30, 2012

Related U.S. Application Data

(60) Provisional application No. 61/446,829, filed on Feb. 25, 2011.

(51) Int. Cl.
*G09G 5/00* (2006.01)
*G06Q 30/02* (2012.01)
*G06T 17/05* (2011.01)

(52) U.S. Cl.
CPC ........... *G06Q 30/0261* (2013.01); *G06T 17/05* (2013.01)

(58) Field of Classification Search
CPC .................................................... G06T 11/001
USPC .......................................................... 345/581
See application file for complete search history.

(56) References Cited

U.S. PATENT DOCUMENTS

| | | | |
|---|---|---|---|
| 7,148,899 B2 * | 12/2006 | Dumesny et al. | 345/582 |
| 7,570,261 B1 | 8/2009 | Edecker et al. | |
| 8,312,486 B1 * | 11/2012 | Briggs et al. | 725/32 |
| 2002/0118299 A1 * | 8/2002 | Kahn | 348/569 |
| 2002/0141636 A1 * | 10/2002 | Wakamoto et al. | 382/154 |
| 2004/0221308 A1 * | 11/2004 | Cuttner et al. | 725/46 |
| 2007/0071397 A1 * | 3/2007 | Nakamura | H04N 5/85 386/231 |

(Continued)

FOREIGN PATENT DOCUMENTS

WO WO 01/58147 A1 8/2001

OTHER PUBLICATIONS

Jin (A Three-Point Minimal Solution for Panoramic Stitching with Lens Distortion, pp. 1-8, 23-28 Jun. 2008, IEEE).*

(Continued)

*Primary Examiner* — Kyle Zhai
(74) *Attorney, Agent, or Firm* — Ditthavong & Steiner, P.C.

(57) ABSTRACT

An approach is provided for location-based presentation of content. A content service platform determines one or more representations of at least one structure. The content service platform also processes and/or facilitates a processing of the one or more representations to determine one or more features of the one or more representations. The content service platform further causes, at least in part, designation of the one or more features as elements of a virtual display area, wherein the one or more representations comprise, at least in part, the virtual display area. The content service platform also causes, at least in part, presentation of one or more outputs of one or more applications, one or more services, or a combination thereof in the virtual display area.

21 Claims, 18 Drawing Sheets

(56) References Cited

U.S. PATENT DOCUMENTS

| | | |
|---|---|---|
| 2007/0077541 A1* | 4/2007 | Champagne ............ A63F 13/10 434/62 |
| 2007/0139416 A1* | 6/2007 | Azuma ........................ 345/473 |
| 2009/0161963 A1 | 6/2009 | Uusitalo et al. |
| 2009/0289956 A1 | 11/2009 | Douris et al. |
| 2009/0303247 A1* | 12/2009 | Zhang et al. ................. 345/594 |
| 2010/0004995 A1 | 1/2010 | Hickman |
| 2010/0146582 A1* | 6/2010 | Jaber et al. ....................... 726/1 |

OTHER PUBLICATIONS

International Search Report for PCT/FI2012/050183 dated Jul. 3, 2012, pp. 1-4.
International Written Opinion for PCT/FI2012/050183 dated Jul. 3, 2012, pp. 1-9.
Office Action for corresponding European Patent Application No. 12749586.9-1955 dated May 25, 2016, 9 Pages.

\* cited by examiner

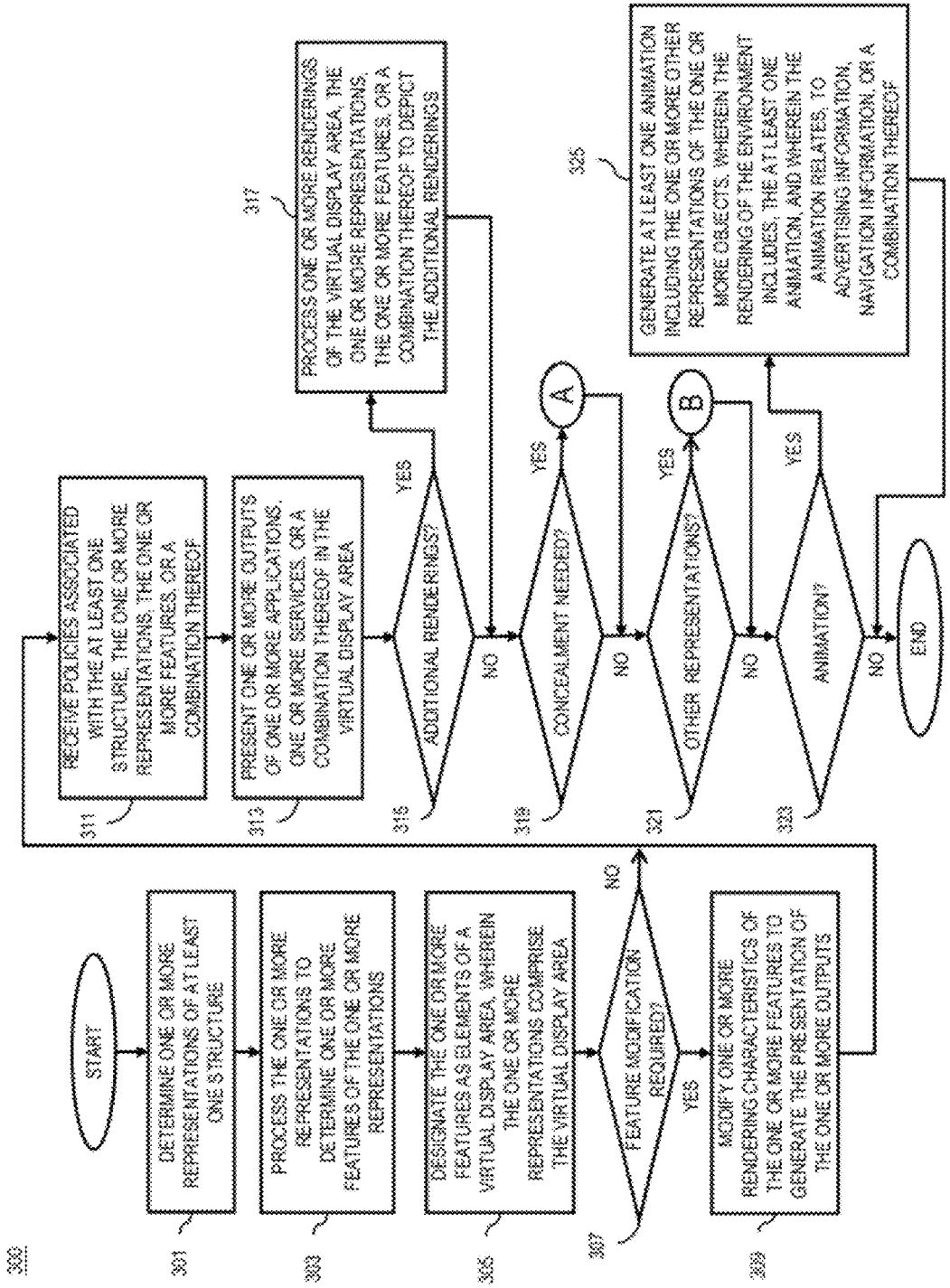

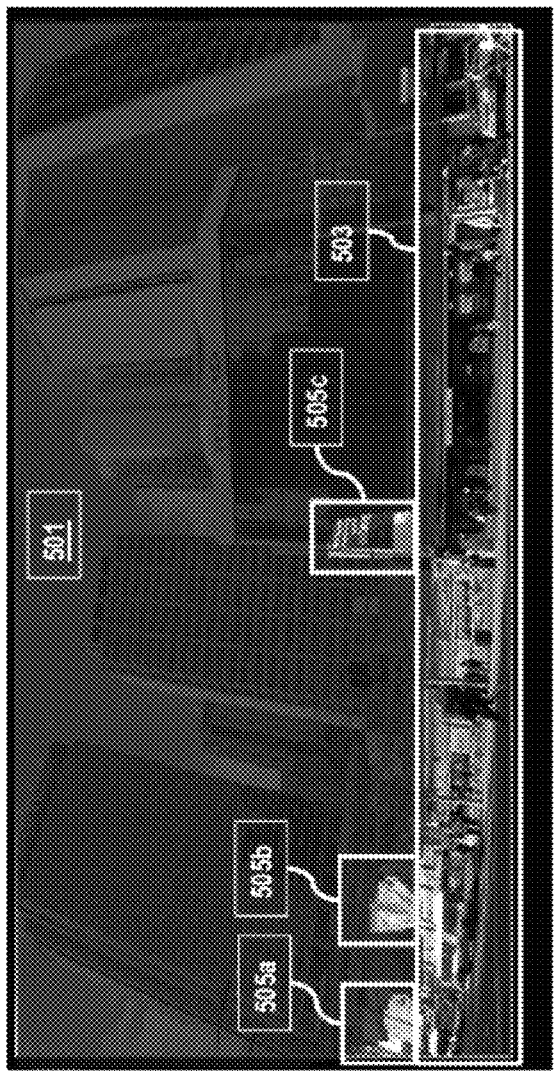
FIG. 5A
FIG. 5B

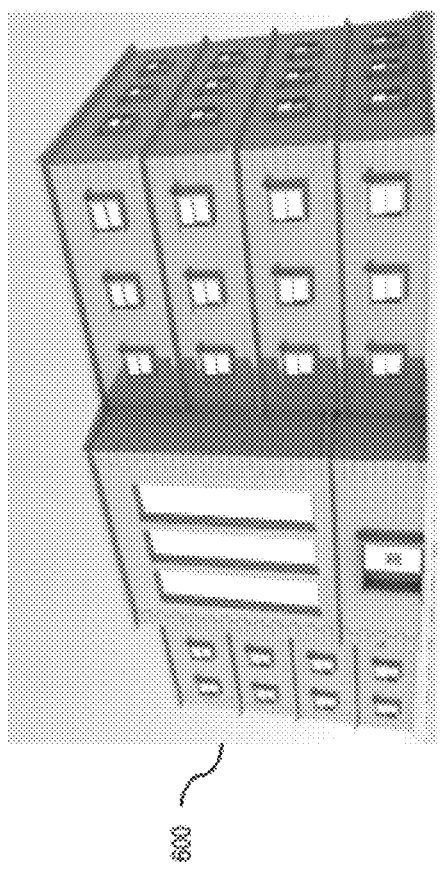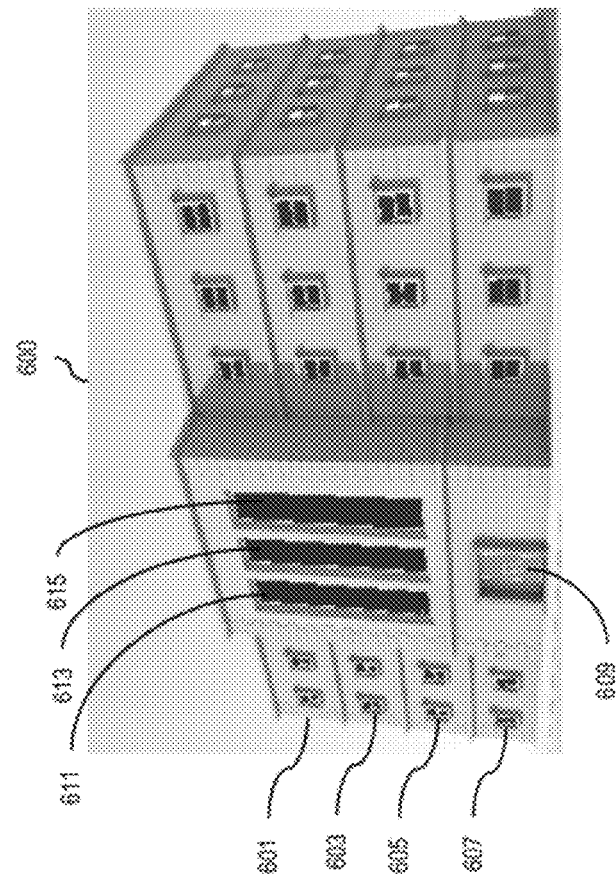
FIG. 6A
FIG. 6B

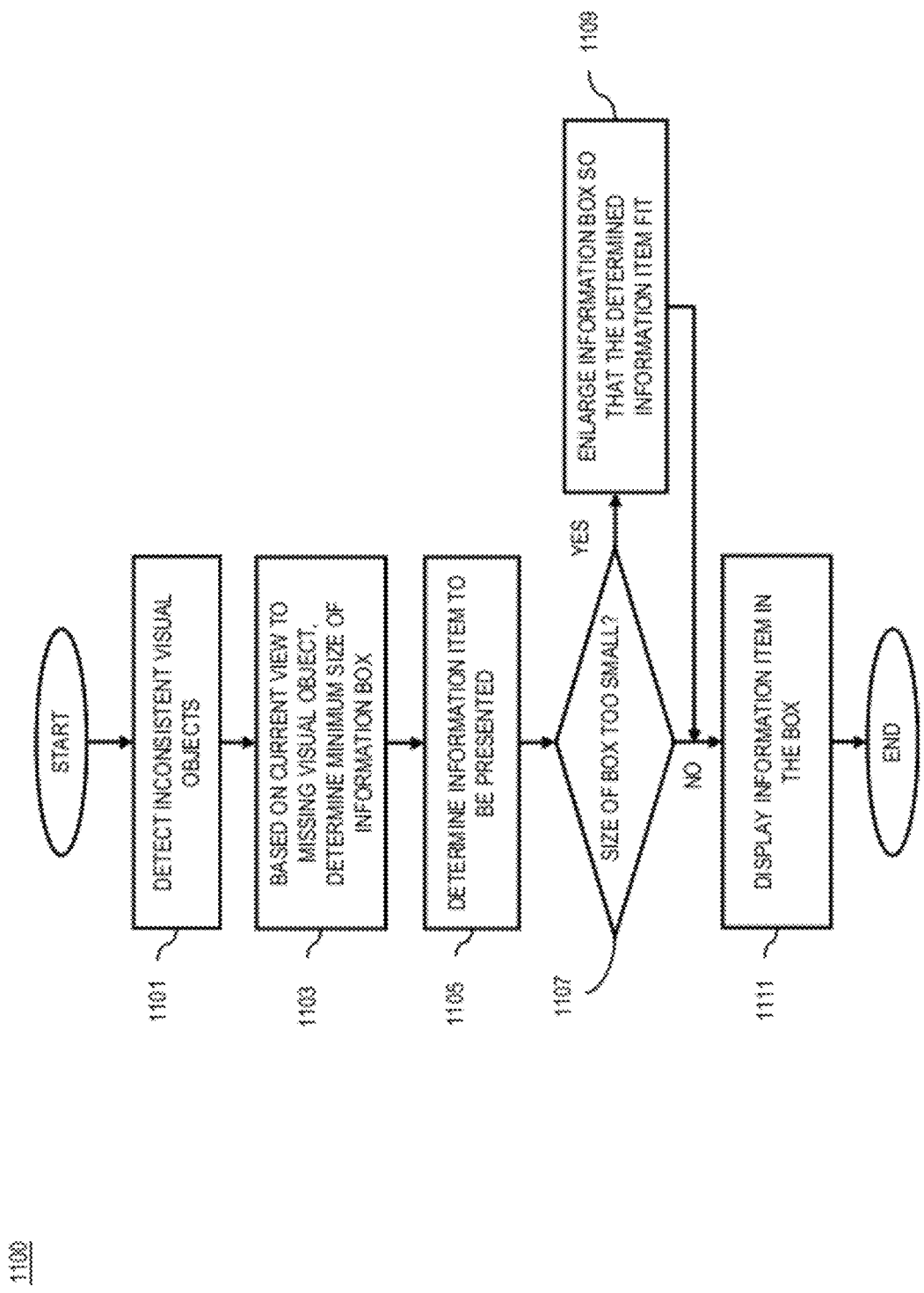

METHOD AND APPARATUS FOR FEATURE-BASED PRESENTATION OF CONTENT

RELATED APPLICATIONS

This application claims the benefit of the earlier filing date under 35 U.S.C. §119(e) of U.S. Provisional Application Ser. No. 61/446,829 filed Feb. 25, 2011, entitled "Method and Apparatus for Feature-Based Presentation of Content," the entirety of which is incorporated herein by reference.

BACKGROUND

Service providers and device manufacturers (e.g., wireless, cellular, etc.) are continually challenged to deliver value and convenience to consumers by, for example, providing compelling network services. One area of interest has been the development of location-based services (e.g., navigation services, mapping services, augmented reality applications, etc.) that have greatly increased in popularity, functionality, and content. Augmented reality and mixed reality applications allow users to see a view of the physical world merged with virtual objects in real time. Mapping applications further allow such virtual objects to be annotated to location information. However, with this increase in the available content and functions of these services, service providers and device manufacturers face significant challenges to present the content which is relevant for users and in ways that can be easily and quickly understood by the users.

Furthermore, recent improvement in technology has provided the possibility of replicating the real world in a parallel virtual environment that the users can access via their computers, mobile devices, etc. These virtual worlds that replicate the real world may be associated with virtual replications of structures of the real world (e.g. buildings). The virtual worlds can also be used for placing virtual advertisements, announcements, sign boards, and other information associated with the virtual structures similar to the billboards and sign boards of the real world associated with the real structures. However, various challenges still exist such as, for example, regulations and rights of use of virtual structures, optimization of inconsistent textures in the representation of virtual worlds, representation of moving objects in virtual worlds, etc.

SOME EXAMPLE EMBODIMENTS

Therefore, there is a need for an approach for providing feature-based presentation of content to overcome the above mentioned and other issues associated with real world replication.

According to one embodiment, a method comprises determining one or more representations of at least one structure. The method also comprises processing and/or facilitating a processing of the one or more representations to determine one or more features of the one or more representations. The method further comprises causing, at least in part, designation of the one or more features as elements of a virtual display area, wherein the one or more representations comprise, at least in part, the virtual display area. The method also comprises causing, at least in part, presentation of one or more outputs of one or more applications, one or more services, or a combination thereof in the virtual display area.

According to another embodiment, an apparatus comprises at least one processor, and at least one memory including computer program code, the at least one memory and the computer program code configured to, with the at least one processor, cause, at least in part, the apparatus to determine one or more representations of at least one structure. The apparatus is also caused to process and/or facilitate a processing of the one or more representations to determine one or more features of the one or more representations. The apparatus further causes, at least in part, designation of the one or more features as elements of a virtual display area, wherein the one or more representations comprise, at least in part, the virtual display area. The apparatus also causes, at least in part, presentation of one or more outputs of one or more applications, one or more services, or a combination thereof in the virtual display area.

According to another embodiment, a computer-readable storage medium carries one or more sequences of one or more instructions which, when executed by one or more processors, cause, at least in part, an apparatus to determine one or more representations of at least one structure. The apparatus is also caused to process and/or facilitate a processing of the one or more representations to determine one or more features of the one or more representations. The apparatus further causes, at least in part, designation of the one or more features as elements of a virtual display area, wherein the one or more representations comprise, at least in part, the virtual display area. The apparatus also causes, at least in part, presentation of one or more outputs of one or more applications, one or more services, or a combination thereof in the virtual display area.

According to another embodiment, an apparatus comprises means for determining one or more representations of at least one structure. The apparatus also comprises means for processing and/or facilitating a processing of the one or more representations to determine one or more features of the one or more representations. The apparatus further comprises means for causing, at least in part, designation of the one or more features as elements of a virtual display area, wherein the one or more representations comprise, at least in part, the virtual display area. The apparatus also comprises means for causing, at least in part, presentation of one or more outputs of one or more applications, one or more services, or a combination thereof in the virtual display area.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3A-3B show a flowchart of a process for providing feature-based presentation of content, according to one embodiment;

FIGS. 5A-5B show panorama images of artificial night mode, according to one embodiment;

FIGS. 6A-6B show modification of rendering characteristics of features, according to one embodiment;

FIG. 11 is a flowchart of a process for providing concealment, according to one embodiment;

DESCRIPTION OF SOME EMBODIMENTS

Examples of a method, apparatus, and computer program for providing feature-based presentation of content are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
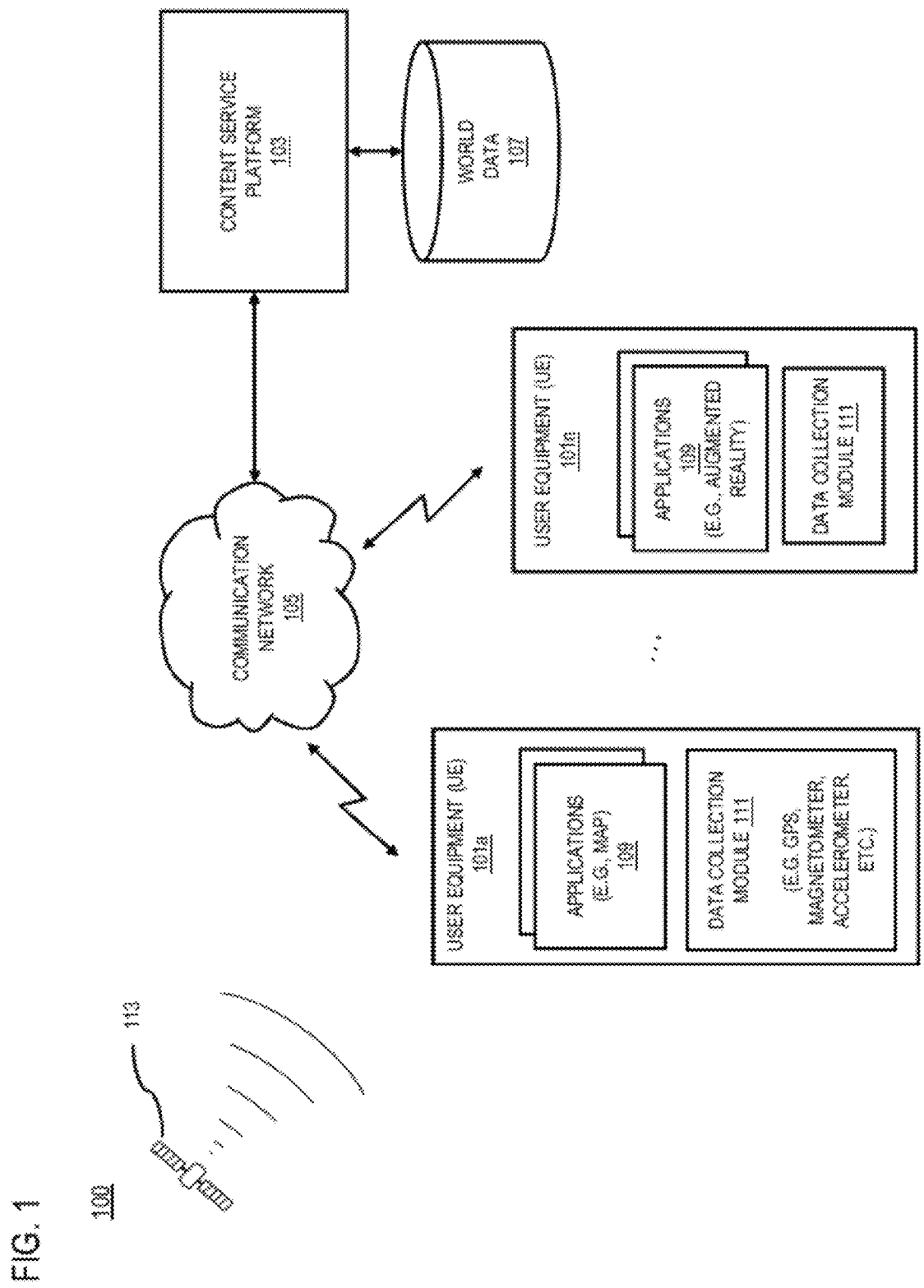
FIG. 1 is a diagram of a system capable of providing feature-based presentation of content, according to one embodiment.

FIG. 1 is a diagram of a system capable of providing feature-based presentation of content, according to one embodiment. It is noted that mobile devices and computing devices in general are becoming ubiquitous in the world today and with these devices, many services are being provided. These services can include augmented reality (AR) and mixed reality (MR), services and applications. AR allows a user's view of the real world to be overlaid with additional visual information. MR allows for the merging of real and virtual worlds to produce visualizations and new environments. In MR, physical and digital objects can co-exist and interact in real time. Thus, MR can be a mix of reality, AR, virtual reality, or a combination thereof.

A benefit of using such applications allows for the association of content to a location, or to one or more structures (e.g. buildings) in the location, wherein the structure in a virtual world may be presented as a three dimensional (3D) object. The content may be shared with others or kept for a user to remind the user of information. Typically, the more precise a structure is defined, the more useful the feature-based content.

However, various issues may arise when providing content based on location, structures and features of the structures. In one embodiment, a structure may have various features with different values and different restrictions associated to them for representation of content. For example, a content service provider and a structure owner may have an agreement based on which the content service provider may represent virtual content only on certain locations or using certain features of the virtual representation of the structure (e.g., windows, doors, etc.). In another embodiment, an owner of a structure in the real world may have reached an agreement with a third party to place real advertisements on a certain part of the structure and have given the third party assurance that their advertisement will not be masked or covered by any other content in the virtual representation of the structure. Therefore, content presentation should be as non-intrusive a manner as needed, or even in a manner improving the whole user experience. To achieve this, the content service provider may, for example, identify locations in the 3D view where visual information such as advertisements can be placed without needlessly occluding the real world scenery in the background.

Furthermore, some regulations may have been put in place, for example by structure owners, city authorities, etc., to enforce processes such as preventing "pollution" or over presentation of content in structures of the virtual world, deciding the level of power one content service provider may have on using the virtual structures for content presentation, etc.

In another embodiment, the scenery as recorded, for example by a camera, may have visual artifacts due to the way the model is generated. Because the city model does not contain geometric detail for all the structures seen in the panoramas, some of the textures may not represent the actual structures. For instance, a car may have been in front of a building when a panorama image was captured, but this car may not be present in the 3D model of the area. Thus the image of the car may have been projected as part of the building wall. When this wall is rendered from a different view-point, the car will appear distorted. This is true for any color or texture that is not projected onto exactly the right 3D location. The amount of distortion is proportional to the error in the 3D location of the point and the difference between the original camera location and the novel view camera location (e.g. exactly at the original camera location all pixels project correctly regardless of the estimated depth). These distortions may be very distracting to the viewer and may significantly reduce the visual appeal of the virtual world. Additionally, the distortions may take user's attention and sometimes make it hard for the user to follow the main transitions and benefit from the main services that the presentation is providing. Furthermore, content presentation on virtual structures with unknown geometry, for example moving structures, is technically hard.

As such, technical challenges arise in determining and associating content with particular features of particular structures. Further, technical challenges arise in retrieving the associated content for presentation to the user.

To address the above mentioned problems, a system 100 of FIG. 1 introduces the capability to provide feature-based presentation of content. In one embodiment, a graphical user interface (GUI) for presenting the content can include attaching the content to a scene (e.g., a portion of a panoramic image, a portion of a camera view, etc.) by utilizing structure models (e.g., building models, tree models, street models, wall models, landscape models, and models of other objects). According to one embodiment, a virtual structure can be a representation (e.g., a two dimensional or three dimensional representation) of a physical structure in the real world or physical environment, or a corresponding virtual structure in a virtual reality world. A representation of a physical structure can be via an image of the structure. With this approach users can view where the content is associated as it is displayed over one or more features of a view (e.g., a panoramic view and/or camera view) as the information associated with the structure model is represented in the GUI.

For example, if the content service provider has been given the right to represent advertisements over the windows of a building structure, the advertisements can be presented on the windows without distortion of other parts of the building. Further, a three dimensional (3D) perspective can be utilized that makes the content to become part of the view instead of an overlay of it. In this manner, the content can be integrated with a surface (e.g., a building facade) of the structure model. To present such a GUI, one or more user equipments (UEs) 101a-101n can retrieve content associated with a feature on a structure of a feature-based service. The UEs 101a-101n can then retrieve a model of the structure and cause rendering of the content based on features of one or more surfaces of the structure model in the GUI.

In one embodiment, in order to prevent "pollution" or over presentation of content in structures of the virtual world, a "night mode" can be established in the virtual world, wherein content presentation can be more eye-catching without overcrowding the view. In this embodiment, the content service platform 103 may change the colors of the window, lighting of buildings, etc., for communicating their message in an animated manner (rather than placing image banners on the buildings).

In another embodiment, in order to make content presentation more interesting and surprising to get user's attention a moving three dimensional object may be used in the virtual presentation of the real world to dynamically carry the contents (e.g. advertisements) instead of statically placing them on structures or features of interest.

In one embodiment, user equipment 101a-101n of FIG. 1 can present the GUI to users. In certain embodiments, the processing and/or rendering of the content may occur on the UEs 101a-101n. In other embodiments, some or all of the processing may occur on one or more content service platforms 103 that provide one or more feature-based services. In certain embodiments, a feature-based service is a service that can provide content (e.g., information, entertainment, advertisement, etc.) based, at least in part, on a feature of a structure. The provided content may be associated with the geographical location of the structure, position of the features of the structure, orientation information of the UE 101a-101n, etc. The UEs 101a-101n and the content service platform 103 can communicate via a communication network 105. In certain embodiments, the content service platform 103 may additionally include world data 107 that can include media (e.g., video, audio, images, texts, etc.) associated with particular contents. This world data 107 can include media from one or more users of UEs 101a-101n and/or commercial users generating the content. In one example, commercial and/or individual users can generate panoramic images of area by following specific paths or streets. These panoramic images may additionally be stitched together to generate a seamless image. Further, panoramic images can be used to generate images of a locality, for example, an urban environment such as a city. In certain embodiments, the world data 107 can be broken up into one or more databases.

Moreover, the world data 107 can include map information. Map information may include maps, satellite images, street and path information, point of interest (POI) information, signing information associated with maps, objects and structures associated with the maps, information about people and the locations of people, coordinate information associated with the information, etc., or a combination thereof. A POI can be a specific point location that a person may, for instance, find interesting or useful. Examples of POIs can include an airport, a bakery, a dam, a landmark, a restaurant, a hotel, a building, a park, the location of a person, or any point interesting, useful, or significant in some way. In some embodiments, the map information and the maps presented to the user may be a simulated 3D environment. In certain embodiments, the simulated 3D environment is a 3D model created to approximate the locations of streets, buildings, features, etc. of an area. This model can then be used to render the location from virtually any angle or perspective for display on the UEs 101a-101n. Further, in certain embodiments, the GUI presented to the user may be based on a combination of real world images (e.g., a camera view of the UEs 101a-101n or a panoramic image) and the 3D model. The 3D model can include one or more 3D structure models (e.g., models of buildings, trees, signs, billboards, lampposts, etc.). These 3D structure models can further comprise one or more other component structure models (e.g., a building can include four wall component models; a sign can include a sign component model and a post component model, etc.). Each 3D structure model can be associated with a particular location (e.g., global positioning system (GPS) coordinates or other location coordinates, which may or may not be associated with the real world) and can be identified using one or more identifier. A data structure can be utilized to associate the identifier and the location with a comprehensive 3D map model of a physical environment (e.g., a city, the world, etc.). A subset or the set of data can be stored on a memory of the UEs 101a-101n.

The user may use one or more applications 109 (e.g., an augmented reality application, a map application, a location services application, a content service application, etc.) on the UEs 101a-101n to provide content associated with one or more features of a structure to the user. In this manner, the user may activate a content services application 109. The content services application 109 can utilize a data collection module 111 to provide location and/or orientation of the UE 101. In certain embodiments, one or more GPS satellites 113 may be utilized in determining the location of the UE 101. Further, the data collection module 111 may include an image capture module, which may include a digital camera or other means for generating real world images. These images can include one or more structures (e.g., a building, tree, sign, car, truck, etc.). Further, these images can be presented to the user via the GUI. The UE 101 can determine a location of the UE 101, an orientation of the UE 101, or a combination thereof to present the content and/or to add additional content.

For example, the user may be presented a GUI including an image of a location. This image can be tied to the 3D world model (e.g., via a subset of the world data 107), wherein various content associated with one or more features of the world model by content service platform 103 can be presented on the image to the user. The user may then select one or more presented contents in order to view detailed information associated with the content. For example, advertisement about a restaurant inside a building may be presented on the door or one a window of the building and user by pressing on the advertisement receive detailed about the exact location of the restaurant (e.g. floor), operation hours, contact information, etc. on the GUI.

In one embodiment, the content service platform 103 may provide an option to the user of UE 101 to select a location on the screen where the user would like to receive certain content or move the received contents around the GUI display. For example, the user may want to see an advertisement on a lower window or a higher window of a building or in the corner of the screen. The user may also be given an option to select the type of content to receive, for example, apparel stores, restaurants, cafes, sports clubs, etc.

In one embodiment, the options a user may be provided with, as for the location and/or the type of the content, can be determined by the content service platform 103 based on various factors, rules, and policies set, for example, by the content providers, real estate owners, city authorities, etc. For example, if a building owner saves certain locations on the virtual display of the building for his/her own content presentation; a user receiving the virtual display may not be allowed to place any content on those specific locations.

In various embodiments, some of the permissions associated with the content can be assigned by the user, for example, the user may select that the user's UE 101 is the only device allowed to receive the content. In this scenario, the content may be stored on the user's UE 101 and/or as part of the world data 107 (e.g., by transmitting the content to the content service platform 103). Further, the permissions can be public, based on a key, a username and password authentication, based on whether the other users are part of a contact list of the user, or the like. In these scenarios, the UE 101 can transmit the content information and associated content to the content service platform 103 for storing as part of the world data 107 or in another database associated with the world data 107. As such, the UE 101 can cause, at least in part, storage of the association of the content and the point. In certain embodiments, content can be visual or audio information that can be created by the user or associated by the user to the point and/or structure. Examples of content can include a drawing starting at the point, an image, a 3D object, an advertisement, text, comments to other content or structures, or the like.

In certain embodiments, the content and/or structures presented to the user via the GUI is filtered. Filtering may be advantageous if more than one content is associated with a structure or a certain feature of a structure. Filtering can be based on one or more criteria determined by users, real estate owners, content providers, authorities, etc. Furthermore, policies may be enforced to associate hierarchical priorities to the filters so that for example some filters override other filters under certain conditions, always, in absence of certain conditions, or a combination thereof. One criterion can include user preferences, for example, a preference selecting types (e.g., text, video, audio, images, messages, etc.) of content to view or filter, one or more content service platforms 103 (e.g., the user or other users) to view or filter, etc. Another criterion for filtering can include removing content from display by selecting the content for removal (e.g., by selecting the content via a touch enabled input and dragging to a waste basket). Moreover, the filtering criteria can be adaptive using an adaptive algorithm that changes behavior based on available content and information (metadata) associated with content. For example, a starter set of information or criteria can be presented and based on the starter set, the UE 101 or the content service platform 103 can determine other criteria based on the selected criteria. In a similar manner, the adaptive algorithm can take into account content removed from view on the GUI. Additionally or alternatively, precedence on viewing content that overlaps can be determined and stored with the content. For example, an advertisement may have the highest priority to be viewed because a user or a content provider may have paid for the priority. Then, criteria can be used to sort priorities of content to be presented to the user in a view. In certain embodiments, the user, the content provider, the real estate owner of a combination thereof may be provided with the option to filter the content based on time. By way of example, the user may be provided a scrolling option (e.g., a scroll bar) to allow the user to filter content based on the time it was created or associated with the environment. Moreover, if content that the user wishes to view is obstructed, the UE 101 can determine and recommend another perspective to more easily view the content.

The UEs 101a-101n are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, Personal Digital Assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

As shown in FIG. 1, the system 100 comprises one or more user equipments (UEs) 101a-101n having connectivity to content service platform via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101a-101n is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101a-101n can support any type of interface to the user (such as "wearable" circuitry, etc.).

By way of example, the UEs 101a-101n and the content service platform communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
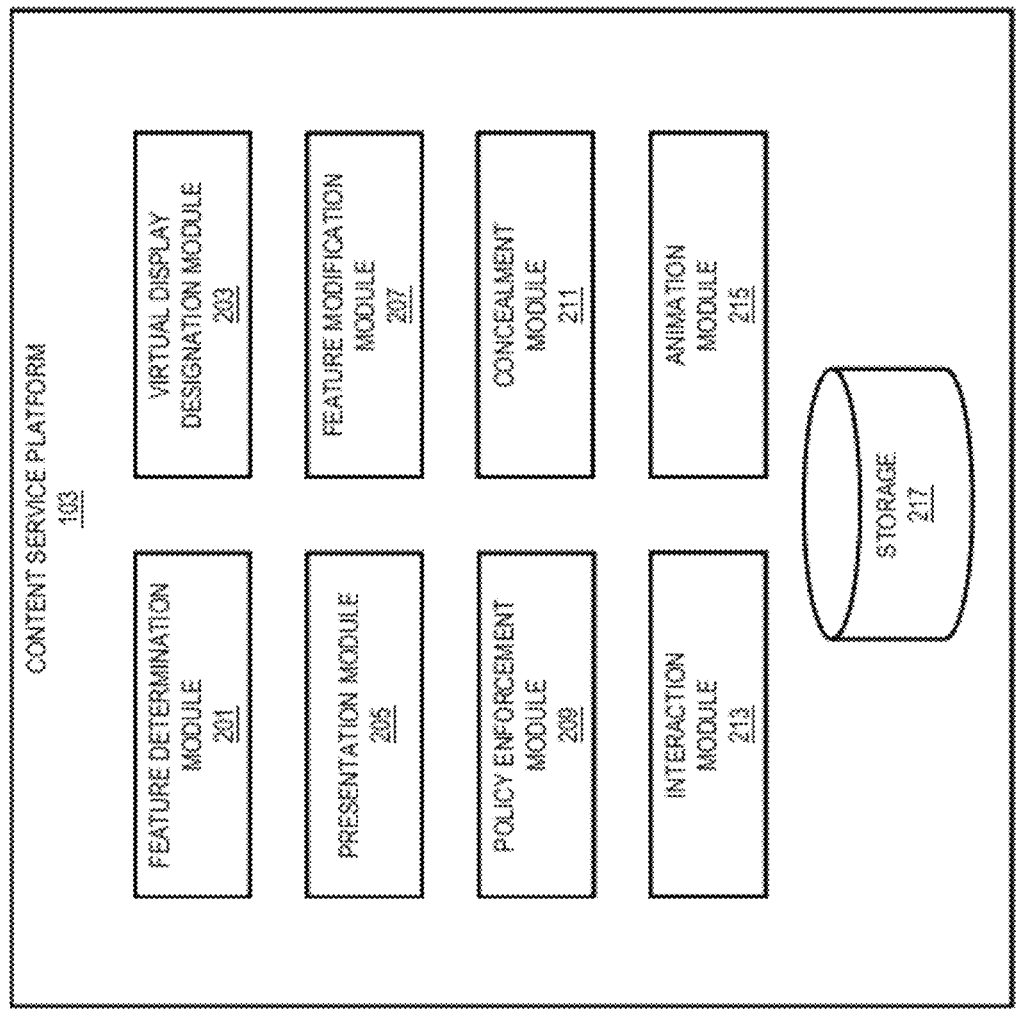
FIG. 2 is a diagram of the components of content service platform, according to one embodiment.

FIG. 2 is a diagram of the components of content service platform, according to one embodiment. By way of example, the content service platform includes one or more components for providing feature-based presentation of content. It is contemplated that the functions of these components may be combined in one or more components or performed by other components of equivalent functionality. In this embodiment, the content service platform includes feature determination module 201, virtual display designation module 203, presentation module 205, feature modification module 207, policy enforcement module 209, concealment module 211, interaction module 213, animation module 215, and storage 217.

In one embodiment, the feature determination module 201, determines one or more representations of at least one structure (e.g., building, tree, wall, etc.). The determined structure may be a virtual presentation of a real world structure, a virtual structure generated without a counterpart in the real world (a car, truck, avatar, banner, etc.) or a combination thereof.

In one embodiment, the feature determination module 201 processes or facilitates processing of the one or more representations to determine one or more features of the one or more representations. The processing of the one or more representations may include utilizing various methods of image processing and/or image recognition in order to recognize the features of the one or more structures, such as doors, windows, columns, etc.

In one embodiment, the virtual display designation module 203 causes designation of the one or more determined features as elements of a virtual display area wherein the one or more representations comprise the virtual display area. The designation of the features as elements of the virtual display may include accessing and retrieval of information associated with the structures and their features. In one embodiment, the one or more features represent, at least in part, one or more windows, one or more doors, one or more architectural features, or a combination thereof of the at least one structure.

In one embodiment, the presentation module 205 causes presentation of one or more outputs of one or more applications, one or more services, or a combination thereof in the virtual display area. The one or more applications and/or services may be activated by the user of UE 101a-101n (e.g. application 109), by content service platform 103, by a component of communication network 105 (not shown) or a combination thereof.

In one embodiment, the presentation module 205, processes and/or facilitates a processing of one or more renderings of the virtual display area, the one or more representations, the one or more features, or a combination thereof to depict a night mode, a day mode, a time of day, a theme, an environmental condition, or a combination thereof. The depiction of mode, theme or condition can attract viewer's attention and prevent distractions in the virtual representation.

In one embodiment, the feature modification module 207 determines to modify one or more rendering characteristics of the one or more features to generate the presentation of the one or more outputs, wherein the one or more characteristics include, at least in part, a lighting characteristic, a color, a bitmap overlay, or a combination thereof. It is noted that even though the virtual display is generated based on the structures of the real world and their features, however the digital characteristics of the virtual display enables various modifications on the features such as color, shape, appearance, lighting, etc. These modifications may affect the user experience and attract user's attention to a certain content, provided information, etc.

In one embodiment, the policy enforcement module 209 receives an input for specifying one or more policies associated with the at least one structure, the one or more representations, the one or more features, or a combination thereof. The policy information may be previously stored in storage 217, and retrieved by the policy enforcement module 209 prior to presentation of outputs by the presentation module 205. In one embodiment, the presentation module 205 may query the policy enforcement module 209 for policies associated with the structures, representations, features or a combination thereof prior to the presentation of the one or more outputs and present the outputs based, at least in part, on the one or more policies received from the policy enforcement module 209.

In one embodiment, the one or more outputs presented by the presentation module 205 may relate, at least in part, to advertising information, and the one or more policies provided by the policy enforcement module 209 may relate to a type of information to display, an extent of the virtual display area to allocate to the one or more outputs, pricing information, or a combination thereof.

In some embodiments, there are visual artifacts in the generated model of the real world. The model may not contain geometric details of all structures and objects seen in the panoramas. Furthermore, some of the textures appearing do not represent any actual structures. For instance, a car may have been parked in front of a building when the panorama image was captured by a camera, but the car is not present in the 3D model of the area. Therefore, the image of the car is projected as part of the building wall. When the wall is rendered from a different view-point, the car may appear distorted in the image. This problem may arise for any color or texture that is not projected onto exactly the right 3D location of the model. The amount of distortion is proportional to the error in the 3D location of the point and the difference between the original camera location and the novel view camera location (e.g. exactly at the original camera location all pixels project correctly regardless of the estimated depth). These distortions may be very distracting and may significantly reduce the visual appeal of the presented outputs. Additionally, the distortions may attract user attention and make it hard to follow any transitions of the presentation for the user. In other embodiments, there may be one or more actual structures and/or objects that for any reason the content service platform 103 may want to conceal them from the presented output.

Accordingly, in one embodiment, the concealment module 211 causes, at least in part, rendering of an environment including, at least in part, the one or more representations, one or more other representations, the one or more features determined by the feature determination module 201, the virtual display area designated by the virtual display designation module 203, the presentation of the one or more outputs by the presentation module 205, or a combination thereof. The concealment module 211 determines one or more areas of the rendered environment including, at least in part, a rendering artifact, a rendering inconsistency, or a combination thereof. As previously described, the area may be a distorted image, an undesired artifact, (e.g., an advertisement from a competitor, given that the policies allow the concealment), etc.

In one embodiment, the concealment module 211 may cause the presentation module 205, to present at least a portion of the one or more outputs, one or more other outputs, or a combination in the one or more areas. For example, the presentation module 205 may cover the distorted part of the image with an advertisement relevant to the area.

In one embodiment, the interaction module 213 determines one or more other representations of one or more objects and causes rendering of an environment by the virtual display designation module 203, in which the one or more other representations interact with the one or more representations, the one or more features, the virtual display area, the presentation of the one or more outputs, or a combination thereof.

In one embodiment, the presentation module 205 causes, presentation of at least a portion of the one or more outputs, one or more other outputs, or a combination thereof, on the one or more other representations of the one or more objects determined by the interaction module 213.

In one embodiment, a content provider may, for example, add virtual objects to the virtual representation of the real world and the interaction module 213 may generate interactions among the virtual objects and the virtual representation of structures. For example, animated characters, objects, vehicles, etc. may be added to the presented output to for example interact with other objects (e.g. as a game), carry advertisements (e.g. banners carried by vehicles, avatars, etc.), etc. In these and other embodiments, the animation module 215 may activate applications 109 from the UE 101a-101n, other applications from storage 217, downloadable applications via communication network 105, or a combination thereof to generate and manipulate one or more animated objects.

Accordingly, in one embodiment, the animation module 215 determines to generate at least one animation including the one or more other representations of the one or more objects determined by the interaction module 213, wherein the rendering of the environment by the virtual display designation module 203 includes, at least in part, the at least one animation, and wherein the animation relates, at least in part, to advertising information, navigation information, game information, or a combination thereof.

Figure 3B:
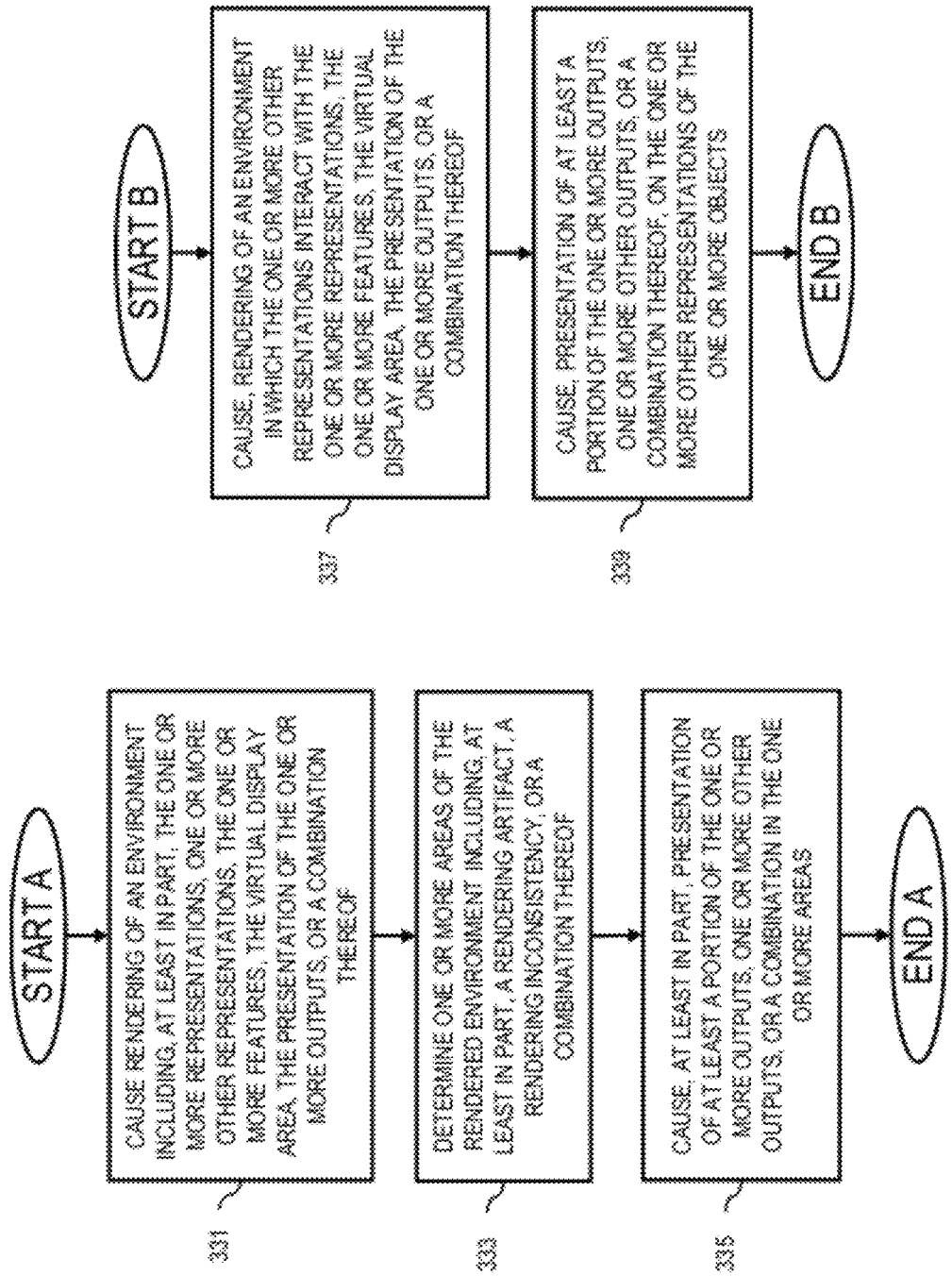
Figure 15:
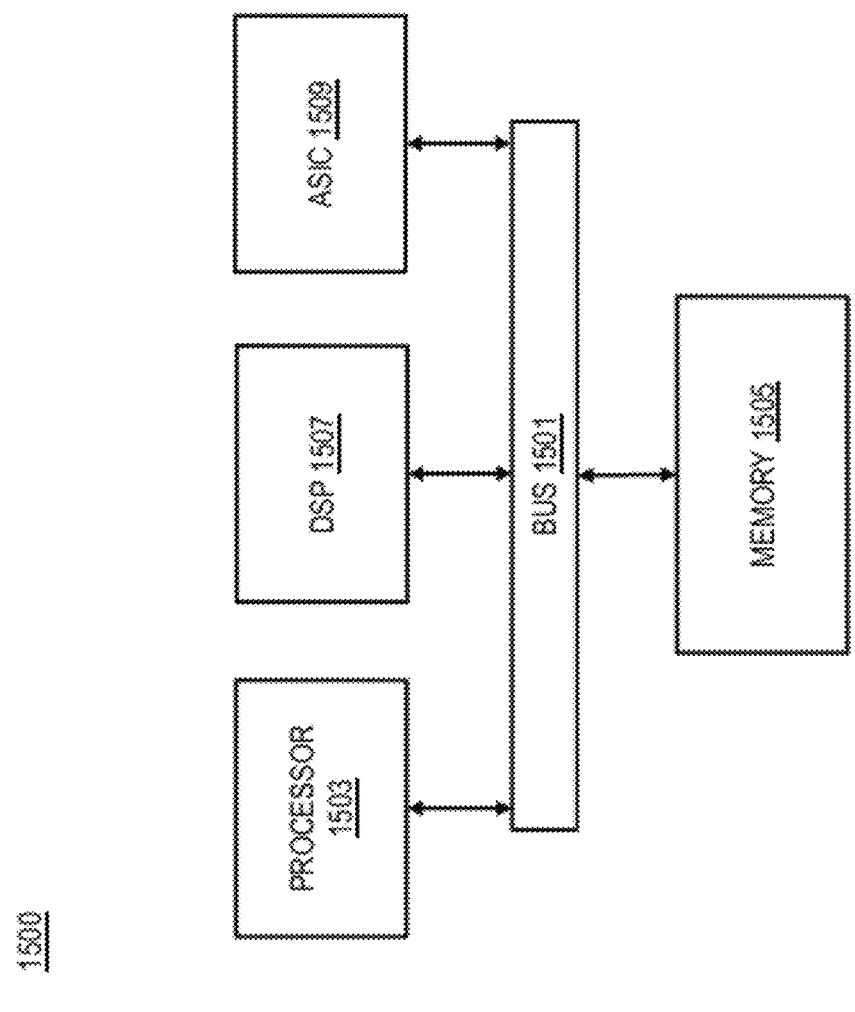
FIG. 15 is a diagram of a chip set that can be used to implement an embodiment of the invention.

FIGS. 3A-3B show a flowchart of a process for providing feature-based presentation of content, according to one embodiment. In one embodiment, the content service platform 103 performs the process 300 and is implemented in, for instance, a chip set including a processor and a memory as shown in FIG. 15.

In one embodiment, in step 301 the feature determination module 201, determines one or more representations of at least one structure (e.g., building, tree, wall, etc.). The determined structure may be a virtual presentation of a real world structure, a virtual structure generated without a counterpart in the real world (a car, truck, avatar, banner, etc.) or a combination thereof. The one or more representations may be associated with views of the at least one structure form different perspectives in a 3D world. Each representation of a structure may show the structure viewed from a different angle revealing various features of the structure that may not be visible in other representations.

In one embodiment, per step 303 the feature determination module 201 processes or facilitates processing of the one or more representations to determine one or more features of the one or more representations. The processing of the one or more representations may include utilizing various methods of image processing and/or image recognition in order to recognize the features of the one or more structures, such as doors, windows, columns, etc.

In one embodiment, in step 305, the virtual display designation module 203 causes designation of the one or more determined features as elements of a virtual display area wherein the one or more representations comprise the virtual display area. The designation of the features as elements of the virtual display may include accessing and retrieval of information associated with the structures and their features such as rules, regulations, restrictions, agreements, initial setups, etc. that determine the relationship between structures, between every structure and its features, between the features of one structure or between features of different structures.

In one embodiment, per step 307, the feature modification module 207 determines whether one or more rendering characteristics of the designated features need to be modified. The modifications may include a change in lighting, coloring or shape of a feature. For example, the building may be shaded as in night mode while one or more of the designated windows get bright light as if the rooms behind them have lights on. As another example, the shape and design of the virtual windows may be modified to create an artistic, architectural, historic, social, etc. statement matching the purpose of the presentation. If the modification is required, per step 309 the feature modification module 207 modifies one or more rendering characteristics of the one or more features, wherein the one or more characteristics include, at least in part, a lighting characteristic, a color, a bitmap overlay, or a combination thereof. It is noted that even though the virtual display is generated based on the structures of the real world and their features, however the digital characteristics of the virtual display enables various modifications on the features such as color, shape, appearance, lighting, etc. The type, level, and method of modification may be determined by one or more applications 109 or by one or more instructions in storage 217 or in the world data 107. These modifications may affect the user experience and attract user's attention to a certain content, provided information, etc.

In one embodiment, per step 311, the policy enforcement module 209 receives an input for specifying one or more policies associated with the at least one structure, the one or more representations, the one or more features, or a combination thereof. The policy information may be previously stored in storage 217 and retrieved by the policy enforcement module 209 from storage 217. In another embodiment, the feature modification module 207 may query the policy enforcement module 209 for policies associated with the structures, representations, features or a combination thereof prior to the modification of the one or more features.

In one embodiment, the policy enforcement module 209 may store the received policies in storage 217. The policy enforcement module 209 may also compare received policies with existing policies to find and resolves any contradictions that may arise. For example, a new policy may indicate that the virtual representation of top floor windows of a building can be modified while a previous policy may prevent any modifications of the same features. In this embodiment, the policy enforcement module 209 may be equipped with a list of authorized policy makers and the power each of them have for policy definition. If the new policy is defined by a source with higher authority than the source of the existing policy, the new policy will override the existing one; otherwise, the policy enforcement module 209 may ignore the newly received policy.

In one embodiment, the policies received, stored and used by the policy enforcement module 209 may include information about available structures or available features of structures for associating contents with. This information may include a fixed fee or a conditional fee (based on time, date, content type, content size, etc.) for content presentation (e.g. advertisement). In some other embodiments, the information about the available structures or features may include auctioning information and policies providing an option for content providers to bid and offer their suggested prices for the location. The auctioning policies may be provided by the building owners, advertisement agencies, etc.

In one embodiment, per step 313, the presentation module 205 causes presentation of one or more outputs of one or more applications, one or more services, or a combination thereof in the virtual display area. The one or more applications and/or services may be activated by the user of UE 101a-101n (e.g. application 109), by content service platform 103, by a component of communication network 105 (not shown) or a combination thereof. Prior to the presentation of one or more outputs, the policy enforcement 209 may verify (and or modify) the output based on the policies associated with the content, the user, the virtual display area (e.g. the structure, the features of the structure) etc.

In one embodiment, the one or more outputs presented by the presentation module 205 may relate, at least in part, to advertising information, and the one or more policies provided by the policy enforcement module 209 may relate to a type of information to display, an extent of the virtual display area to allocate to the one or more outputs, pricing information, or a combination thereof.

For example, in one embodiment, a building may have 10 levels and 5 windows on every level. The 5 windows of the $10^{th}$ level may be reserved by the building owner for the owner's specific advertisements (e.g. rental ads) while the windows on levels 1 to 9 may be available as display areas for use by other content providers. A policy may have been set by the building owner that, for example, windows of each level can all be associated with one display area only, and not to be shared by different display areas. In one embodiment, the content type(s) appearing on each display area may be initially regulated, while in other embodiments, a display area may be available for use with any content type.

In one embodiment, per step 315, the presentation module 205 checks whether additional renderings of the virtual display area, such as night mode, day mode, time of day, environmental condition, themes, etc., need to be processed. In this embodiment, if additional renderings exist, per step 317 the presentation module 205 or the feature modification module 207, process the additional renderings to depict them on the virtual display. In the above example, the presentation module 205 may generate a night mode on the unused windows of levels 1 to 8 in order to attract viewer's attention to the contents presented on windows on levels 9 and 10. It is noted that, even if windows of levels 1 to 8 are used, the policy enforcement module 209 may provide the presentation module 205 with the authority to overlay them with a night mode when, for example, the contents presented on windows of levels 1 to 8 are irrelevant to the view or the contents to be presented on windows of levels 9 and 10 are of a very high priority compared to the contents presented at levels 1 to 8.

In some embodiments, there are visual artifacts in the generated model of the real world. The model may not contain geometric details of all structures and objects seen in the panoramas. Furthermore, some of the textures appearing do not represent any actual structures. For instance, a car may have been parked in front of a building when the panorama image was captured by a camera, but the car may not be present in the 3D model of the area. Therefore, the image of the car is projected as part of the building wall. When the wall is rendered from a different view-point, the car may appear distorted in the image. This problem may arise for any color or texture that is not projected onto exactly the right 3D location of the model. The amount of distortion is proportional to the error in the 3D location of the point and the difference between the original camera location and the novel view camera location (e.g. exactly at the original camera location all pixels project correctly regardless of the estimated depth). These distortions may be very distracting and may significantly reduce the visual appeal of the presented outputs. Additionally, the distortions may attract user attention and make it hard to follow any transitions of the presentation for the user. In other embodiments, there may be one or more actual structures and/or objects that for any reason the content service platform 103 may want to conceal them from the presented output.

Accordingly, in one embodiment, per step 319, the concealment module 211 checks whether any distortions exist in the virtual display. The concealment module 211 may also receive instructions from the presentation module 205 that certain parts of the display need to be concealed. The concealment instructions may be provided by the policy enforcement module 209 based on policies. For example, a structure may need to be concealed for security reasons even though there is no distortion in the virtual display.

Per step 331 of FIG. 3B, the concealment module 211 causes, at least in part, rendering of an environment including, at least in part, the one or more representations, one or more other representations, the one or more features determined by the feature determination module 201, the virtual display area designated by the virtual display designation module 203, the presentation of the one or more outputs by the presentation module 205, or a combination thereof. In step 333 the concealment module 211 determines one or more areas of the rendered environment including, at least in part, a rendering artifact, a rendering inconsistency, or a combination thereof. As previously described, the area may be a distorted image, an undesired artifact, (e.g., an advertisement from a competitor, given that the policies allow the concealment), etc.

In one embodiment, per step 335, the concealment module 211 may cause the presentation module 205, to present at least a portion of the one or more outputs, one or more other outputs, or a combination in the one or more areas. For example, the presentation module 205 may cover the distorted part of the image with an advertisement relevant to the area.

In one embodiment, per step 321, the interaction module 213 determines one or more other representations of one or more objects. For example, one or more applications 109 may introduce new virtual objects to be presented in the virtual display even though the virtual objects do not exist in the real world view. If other representations exist, per step 337 the interaction module 213 causes rendering of an environment by the virtual display designation module 203, in which the one or more other representations interact with the one or more representations, the one or more features, the virtual display area, the presentation of the one or more outputs, or a combination thereof. The interaction module 213 may utilize one or more applications 109 for providing interaction among structures and/or features in the virtual display.

In one embodiment, per step 339, the presentation module 205 causes, presentation of at least a portion of the one or more outputs, one or more other outputs, or a combination thereof, on the one or more other representations of the one or more objects determined by the interaction module 213.

In one embodiment, an application 109 associated with a content provider (not shown) may, for example, provide animated virtual objects to be added to the virtual representation of the real world. In step 323, the animation module 215 checks whether one or more animated objects are introduced. If animated objects are introduced, per step 325 the animation module 215 generates at least one animation including the one or more other representations of the one or more objects determined by the interaction module 213, wherein the rendering of the environment by the virtual display designation module 203 includes, at least in part, the at least one animation, and wherein the animation relates, at least in part, to advertising information, navigation information, game information, or a combination thereof. In these and other embodiments, the animation module 215 may activate applications 109 from the UE 101a-101n, other applications from storage 217, downloadable applications via communication network 105, or a combination thereof to generate and manipulate one or more animated objects.

In one embodiment, the interaction module 213 may generate interactions among the virtual objects, animations and the virtual representation of structures. For example, animated characters, objects, vehicles, etc. may be added to the presented output to for example interact with other objects (e.g. as a game), carry advertisements (e.g. banners carried by vehicles, avatars, etc.), etc.

Figure 4:
FIG. 4 is a 3D city model, according to one embodiment.

FIG. 4 is a 3D city model, according to one embodiment. In one embodiment, the world data 107 may include, apart from the 360 degree panoramic street imagery, a 3D model 401 of an entire city. The 3D model 401 may be created based on the Light Detection and Ranging (LIDAR) technology which is an optical remote sensing technology and can measure distances to a target structure or other features of the structure by illuminating the target with light. By measuring the time delay of the light being returned from the structures, the distance between different points can be calculated and depth masks created. Additionally, the intensity of the returning light and the distribution of measured distances can be used to identify different kinds of surfaces. Furthermore, scanning of objects such as cars, building footprints, etc. may be provided based on digital maps used in navigation systems. Therefore, the 3D morphology of the ground at any point (terrain), and the geometry of the structures (e.g. buildings) can be determined in detail.

The 3D city model 401 may not be directly visible to the user of UE 101a-101n, but instead hidden behind the panoramas that the user can see on the presented display on the UE 101a-101n. Utilizing the 3D model 401 provides the capability of highlighting structures, detecting distortions in images, adding content to the structures and their features, etc.

FIGS. 5A-5B show panorama images of artificial night mode, according to one embodiment. FIG. 5A is a panoramic image taken during the day time with normal daylight. FIG. 5B shows artificial night mode 501 created for upper part of FIG. 5B while the street view (inside block 503) and advertisement banners 505a-505c have been emphasized by preserving their daylight. The partial change of lighting in some parts of the imagery provides attraction for user to notice the emphasized parts of the image and dismiss the dark parts. Furthermore, utilization of the depth map creates a close to real visual effect.

FIGS. 6A-6B show modification of rendering characteristics of features, according to one embodiment. In one embodiment, utilizing the data provided by the Light Detection and Ranging (LIDAR) technology, and applying computer vision and segmentation techniques, the created modules of structures (e.g. buildings) can be refined through an automated content processing pipeline. FIG. 6A shows a detailed building model 600 automatically generated from raw data.

In one embodiment, via a process such as, for example, automated pattern recognition, the feature determination module 201 of the content service platform 103 can identify different features of a structure. For example, in FIG. 6B, the feature determination module 201 has determined windows in 4 rows 601, 603, 605, and 607 on the front of building 600, door 609, and columns 611, 613, and 615 as regions of interest.

In one embodiment, the owner of building 600 may have agreed, for example via a management interface, that the determined features of building 600 can be used for advertisement. The owner may have also agreed that the determined features can be modified based on advertisers needs, via the feature modification module 207, identifying the level and/or frequency of modification. For example, the owner may allow only the modification of small windows of rows 601-607, but no modification of door 609 or columns 611-615.

In other embodiments, the building owner may allow specific types of feature modification by the feature modification module 207 such as for example, only overlaying of different colors on the windows of rows 601-607 are allowed, or only lighting modification "light on"/"light off" of the windows is allowed, etc., or allow placing any bitmap image on the windows (e.g. a larger image can be constructed with a mosaic of partial images placed on adjacent windows).

In other embodiments, the owner may configure the frequency based on which the features can be modified (e.g. allow changing of window lighting every 1 second, or every 5 minutes, etc.). Additionally, the owner may, for example, decide that modification of the columns 611, 613, and 615 is not allowed.

In one embodiment, the owner can associate prices for temporary or permanent rights of use of different parts of the building model. For example an advertiser may be given the right for controlling light of the small window of rows 601-607 for the price of 10 US Dollars per week, controlling light of the columns 611-615 for the price of 20 US Dollars per week, etc. The regulations provided by the building owner may be stored in storage 217 and managed by policy enforcement module 209. On the other hand, the advertiser may pay the amount determined by the building owner, plus an extra percentage to the managing entity of the content service platform 103 for providing the end-to-end service.

Figure 7A:
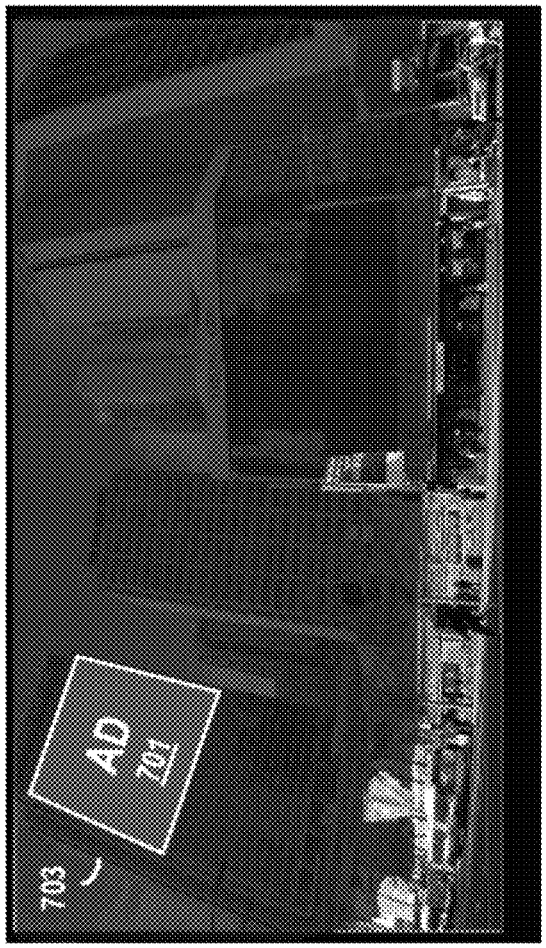
FIGS. 7A-7B show presentation of advertisement messages on buildings, according to one embodiment.
Figure 7B:
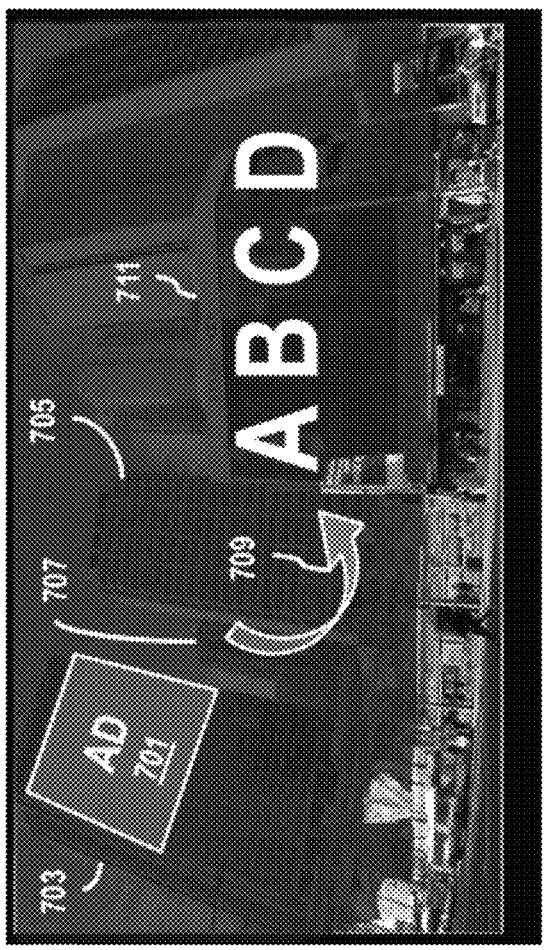

FIGS. 7A-7B show presentation of advertisement messages on buildings, according to one embodiment. In one embodiment, an advertiser can acquire the right to control the lighting and/or color of different structure models, for example for writing messages on the virtual display of the buildings, which are displayed to the users visiting those locations. For example in FIG. 7A a billboard 701 has been presented on building 703 where the entity acquiring the right of using the billboard may present its content on the billboard according to the agreement with building owner.

In another embodiment, the advertiser may acquire the right to control the lighting and/or color of multiple building models. This may allow presentation of more impressive, eye catching messages, across multiple buildings. As seen in FIG. 7B, the advertiser is using billboard 701, and arrow 709 that spans across buildings 705 and 707 to bring attention to the part of advertisement on building 711. In this embodiment, the advertising entity may need to have agreements with the owners of buildings 703, 705, 707, and 711.

In one embodiment, when an advertisement is split across multiple buildings, the policy enforcement module 209 verifies that the advertisement can be presented on top of the buildings and that the advertising fee is split between the owners of the buildings 703, 705, 707, and 711, for example, equally between all buildings or on the basis of the advertisement size and/or building location. The advertisement messages may consist of text, images, animations, videos, or interactive applications (such as games).

In another embodiment, an advertisement mode may consist of processed panorama images that may give the scenery a new look such as a night time scene, snow scene, festival scene, etc. The modified scenery by the feature modification module 207 can make the advertisements more exciting and interesting. In this embodiment, prior to the presentation of advertisement the color levels of the panoramas image may be manipulated and then location based ads would be presented on top of the view. The user may be provided with an option to switch, for example, between the advertisements in night view, advertisement with day view, day view without the advertisement, etc.

Figure 8B:
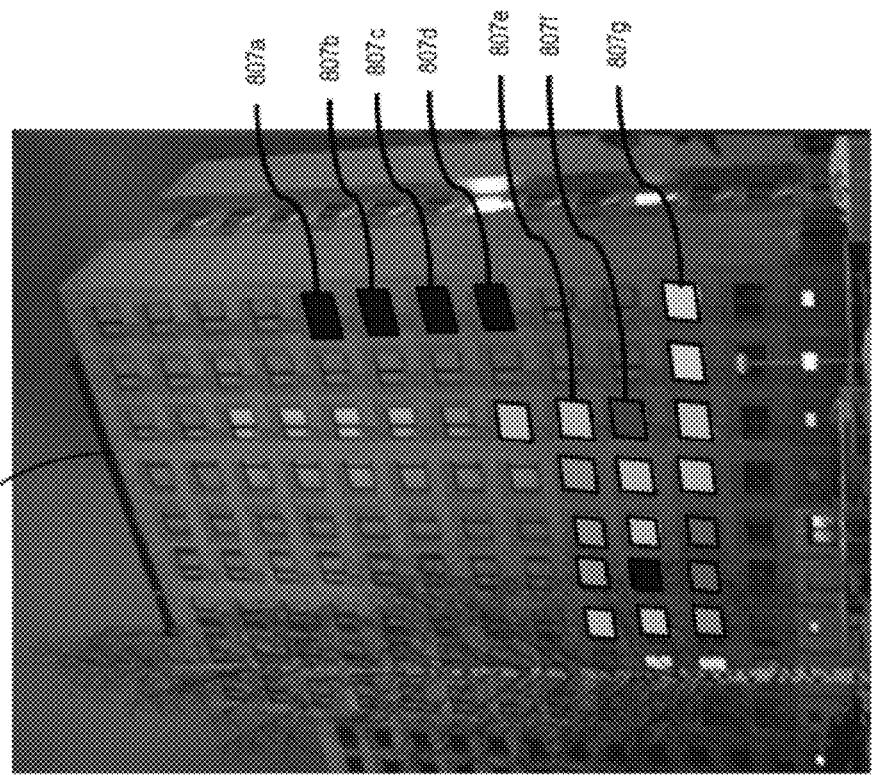
FIGS. 8A-8B show presentation of moving virtual objects, according to one embodiment.
Figure 8A:
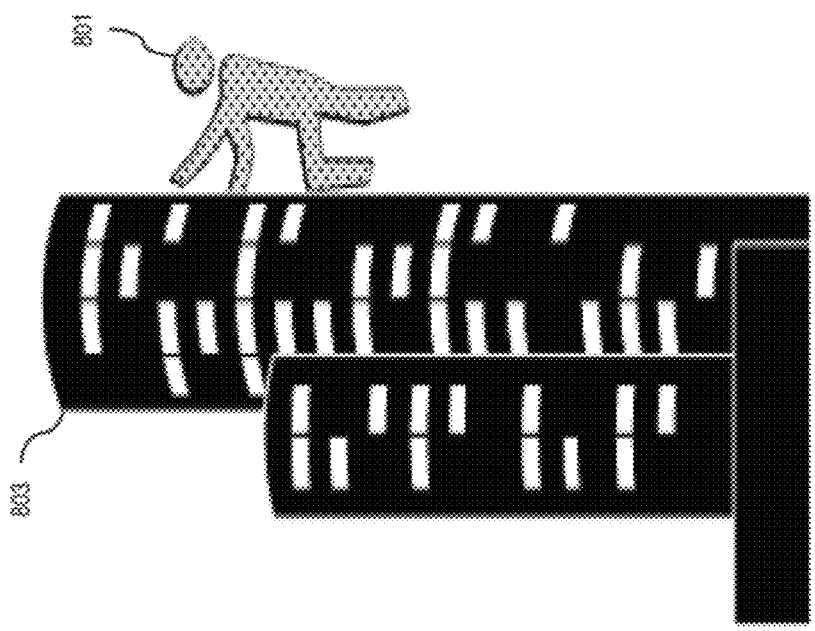

FIGS. 8A-8B show presentation of moving virtual objects, according to one embodiment. In one embodiment, animated features can be generated to emphasize on the messages and/or advertisement and to enhance the virtual display. Animated effects may be added to the features of the display, for example car lights may sparkle with different colors. In other embodiments, virtual animated characters related to the advertisements can be generated by the animation module 215 to move around in the display. As seen in FIG. 8A an animated character 801 is climbing up the building 803. The animated characters may appear not only on top of a building, but also around the contour of a building. Such surprising content may motivate users, for example, to switch to the "night mode" or any other mode that expose the user to the advertisements. In one embodiment, the interaction module 213 may enable the use interact with the animated figure 801. The interaction may also be planned to guide the user towards viewing advertisements.

In one embodiment, the interaction provided by the interaction module 213 may be designed as a video game using the features presented by the display. As illustrated in FIG. 8B, the windows of rows 807a-807g of building 805 are used to create a game (e.g. such as Tetris) wherein the virtual display of windows can have different colors. The user may interact with colored blocks appearing on the windows as part of an interactive advertisement illustrated in form of a Tetris-type game. The interaction can be managed by the interaction module 213.

In one embodiment, the content service platform 103 may include a component to calculate advertisement costs, for example for presenting ads on buildings during a given period of time (optionally, by taking into account the number of times the ads have been viewed or clicked by the users). The component may also generate bills for advertisement agencies according to the calculations and reimburse the building owners after receiving the payments.

Figure 9A:
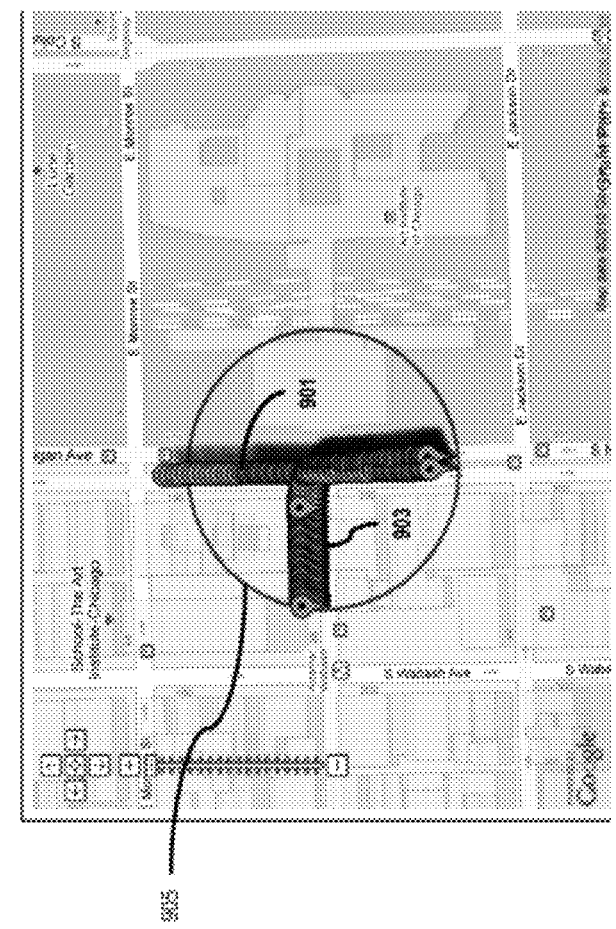
FIGS. 9A-9B show positioning for acquiring panoramic imagery, according to one embodiment.
Figure 9B:
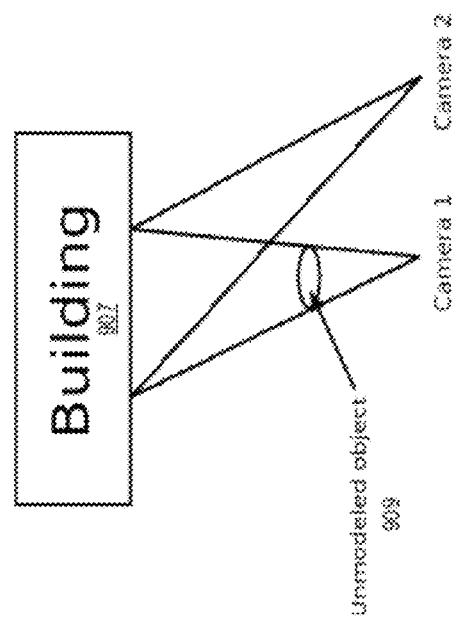

FIGS. 9A-9B show positioning for acquiring panoramic imagery, according to one embodiment. The content service platform 103 brings content (e.g. street-view panoramas) to the users and allows users to navigate among the content, as a way of remotely exploring the real world. The real world content required for generation of virtual displays is typically acquired by special cars, equipped with panoramic cameras, GPS systems, laser scanners, etc. to obtain 3D models of structures in the real world. However, the real world panoramas usually have very high densities, as the cameras used to generate these images captures a 360 degrees photo every few meters, as shown in FIG. 9A. In FIG. 9A, the rows 901 and 903 of location icons show the numerous locations for capturing panoramas by cameras in order to generate a virtual display of the inside of circle 905.

In one embodiment, for easy navigation and to help users navigating in the virtual world consisting of 3D building models and panoramas of the real world, it is possible to render novel views between panoramas and animate transitions between every two panorama images. The novel view generation can be implemented, for example, by projecting the panorama imagery as textures onto the building models and rendering the resulting scene from any view point. A visually rich and compelling virtual view such as a panorama-based 3D street view also provides an intriguing platform for presenting augmented content such as advertisements or contextual information to the user.

In one embodiment, it may be desirable to present the augmented information to the user in as non-intrusive a manner as possible, or if possible, in a manner improving the whole user experience. This can be achieved by the content service platform 103 by identifying locations in the 3D virtual view where visual information such as advertisements can be placed without needlessly occluding the real world scenery in the background.

In another embodiment, the scenery itself may have visual artifacts due to the way the structure model is generated. It is noted that the city model of FIG. 4 does not contain geometric details for all the objects seen in the panoramas captured by cameras. For example, some of the textures in panorama images may not represent actual objects. For instance, a car may have been parked in front of a building when the panorama image was captured, but the car is not present in the 3D model of the area taken from city model of FIG. 4. Therefore, the image of the car is projected as part of the building wall.

As seen in FIG. 9B, assuming that the city model of building 907 includes the building itself, while the image captured by camera1 from building 907 includes the un-modeled object 909. On the other hand, the image captured by camera2 has no view of object 909.

In one embodiment, when building 907 is rendered from a different view-point combining the images from camera1 and camera2, the un-modeled object 909 may appear distorted. This is true for any color or texture that is not projected onto exactly the right 3D location.

The amount of distortion of the image is proportional to the error in the 3D location of the point and the difference between the original camera location and the novel view camera location (e.g. exactly at the original camera location all pixels project correctly regardless of the estimated depth). These distortions are very distracting and significantly reduce the visual appeal of the application. They also grab user's attention and sometimes make it hard for the user to follow the transitions.

Figure 10:
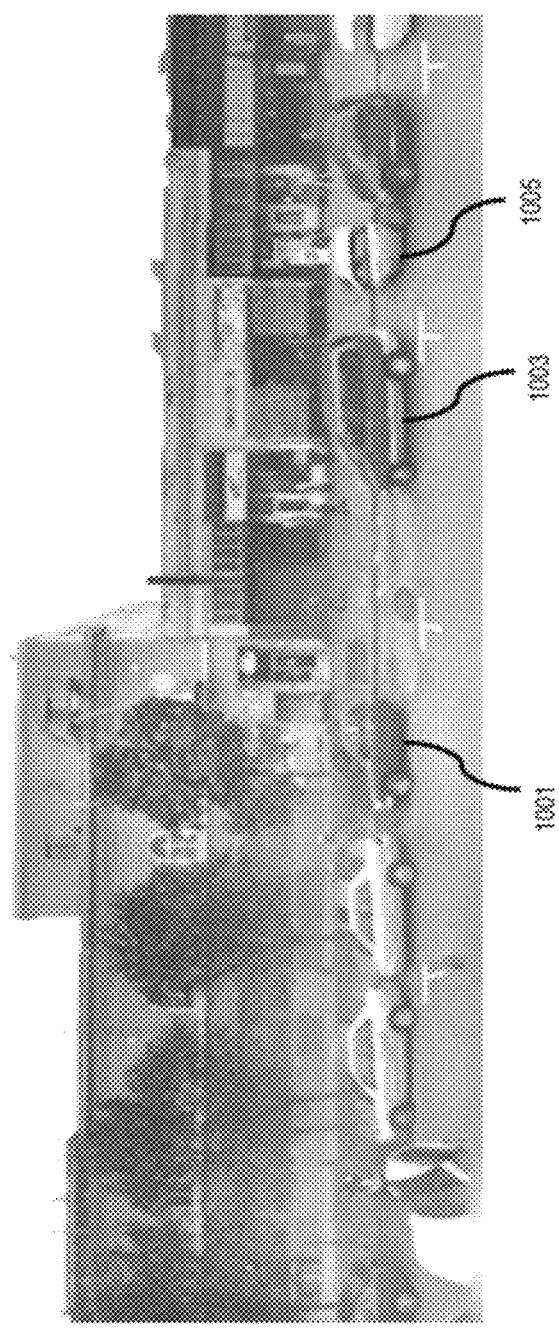
FIG. 10 shows a distorted screen capture, according to one embodiment.

FIG. 10 shows a distorted screen capture, according to one embodiment. In FIG. 10 presentation method includes slices from multiple panoramas (as seen in FIG. 9B) processed into a one wide picture. As seen in FIG. 10 the cars parked on the street including cars 1001, 1003, and 1005 have distorted shapes.

The angular difference between the locations of camera1 and camera2 of FIG. 9B decreases when moving away from the building 907 which makes merging of different slices visually more appealing when camera locations get further from the building 907. So in this case an additional problematic area closer to the camera locations may exist.

In one embodiment, the concealment module 211 uses various techniques such as computer vision techniques to detect areas with distortion issues and hides the distorted areas under advertisements, or other augmented information items. Virtual advertisements can be directly placed into the 3D city model as virtual objects and will thus always render "perfectly". Since the distorted areas may be distracting and annoying for the user, the advertisement that can normally be a nuisance can in this situation serve to improve user experience.

Additionally, the advertisements may only be displayed during transitions from one panorama image to another, as this is when the distortions appear prominently, to further improve user experience.

In one embodiment, the problematic areas can be detected via analyzing the differences between the textures projected from two nearby panoramas by the concealment module 211. When transitioning from one panorama to the next, if a given 3D point is visible from both panoramas, then the color of that point should be approximately the same in both panoramas. Equivalently, the texture for the area should be the same regardless of which panorama is used to generate the view In FIG. 9B the depth from the city model 401 does not match with the actual depth in the panoramas captured by camera1 and camera2 which leads to inconsistent projection of the image. In one embodiment, if the un-modeled object 909 does not appear in the image, camera1 and camera2 would yield the same texture for building 907. However, since object 909 appears in the image taken by camera1, the part of building 907 covered by object 909 can be a candidate location for advertisement placement.

FIG. 11 is a flowchart of a process for providing concealment, according to one embodiment. In one embodiment, per step 1101 the concealment module 211 detects inconsistencies, for example by comparing multiple adjacent views. For example, as for the case of FIG. 9B, the concealment module 211 can detect that the incorrectly modeled object 909 is present in the view from camera1 and determine to hide it with an advertisement when the image from camera1 is used for texturing. Per step 1103, the concealment module 211 determines the size of the incorrectly modeled object 909 based on which the initial and minimum size of the content box where an advertisement or other content will be displayed is determined.

In one embodiment, per step 1105 the content service platform 103 determines an ad or any other content to be placed in the determined content box. In step 1107 the concealment module 211 checks whether the content box is large enough to present the selected content. If the box size is large enough, per step 1111 the concealment module 211 displays the content (e.g. the advertisement) in the box. However, if the box size is too small for the selected content, per step 1109 the concealment module 211 enlarges the box so that the determined content fit in it. In one embodiment, prior to modification of size of the content box, the concealment module 211 may seek the approval of the policy enforcement module 209 to ensure that the extension of content box will not violate any policies previously associated with building 907. In one embodiment, the shape of the content box may also be determined based on the shape of the missing or inconsistent object 909.

Figure 12B:
FIGS. 12A-12B show applied concealments, according to one embodiment.
Figure 12A:

FIGS. 12A-12B show applied concealments, according to one embodiment. As seen in FIG. 12A, the image presents an inconsistent (distorted) object inside dotted circle 1201. In FIG. 12B the distorted area 1201 is concealed by the concealment module 211 using the advertisement 1203. In one embodiment, the advertisement can be shown in the view perspective and with shadings that make it appear as more in the scene element, i.e. as part of the view.

Figure 13A:
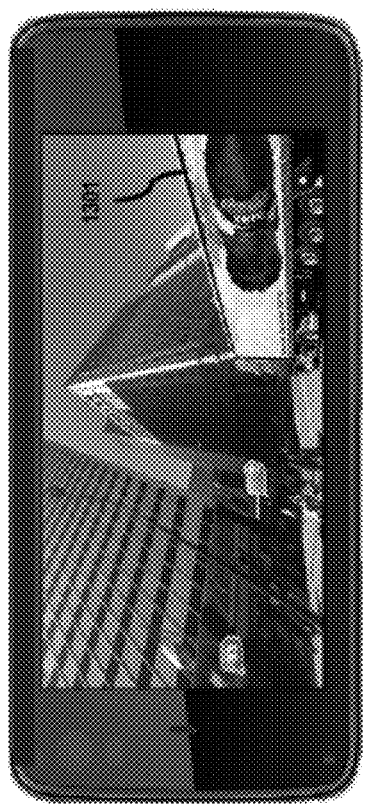
FIGS. 13A-13F show presentation of moving virtual objects, according to one embodiment.
Figure 13B:
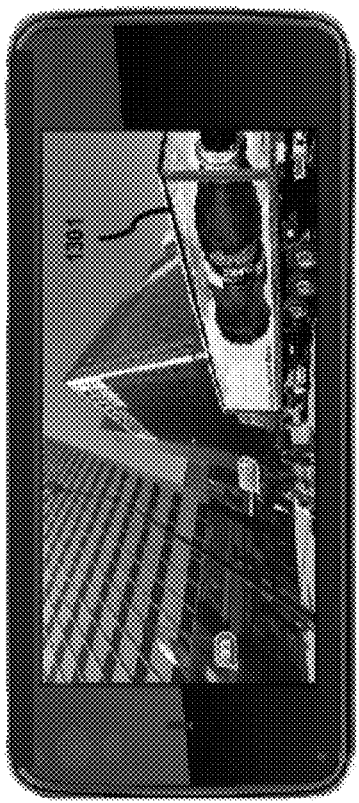
Figure 13C:
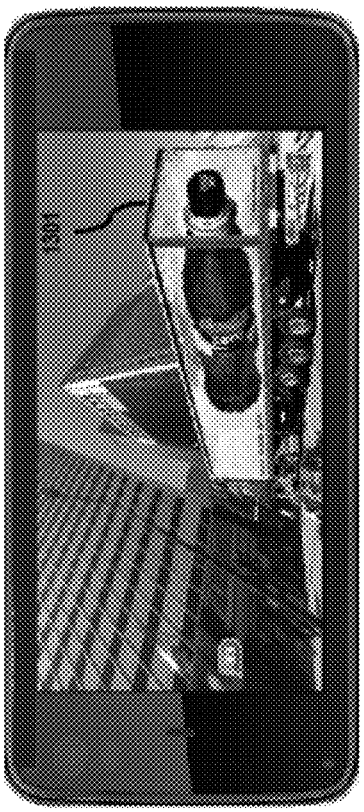
Figure 13D:
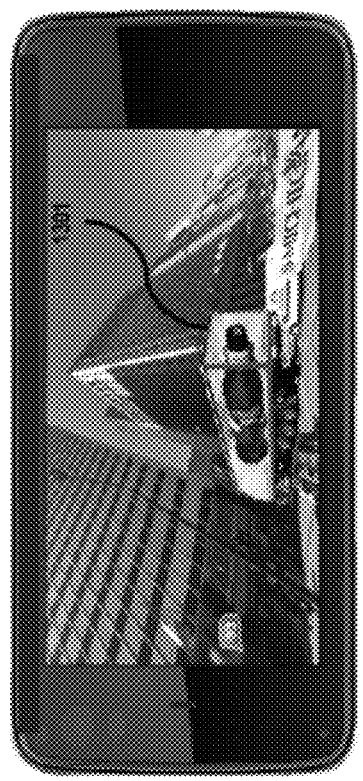
Figure 13E:
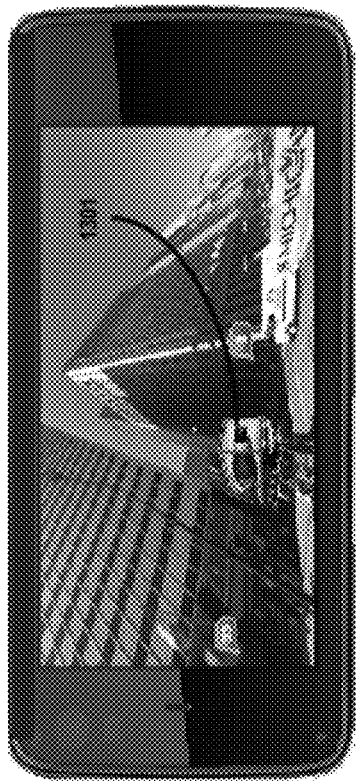

FIGS. 13A-3F show presentation of moving virtual objects, according to one embodiment. In one embodiment, the content instead of being placed on specific structures, regions, buildings, etc. can be placed on virtually generated (and possibly moving) objects. In this embodiment, the content will not pollute the structures of the display. This representation may fully utilize the power of 3D city models such as model 401 which are available behind the streetview imagery. This presentation method may allow using more innovative ways of content presentation (e.g. advertising), as 3D objects can move on predefined routes. Additionally, different types of 3D objects may be used.

In one embodiment, any type of 3D object can be placed anywhere in the virtual world view carrying the content. In this case, with a predetermined location and moving path for the 3D object, the location of the object, the perception, the distortions, etc. can be previously known. As seen in FIGS. 13A-13E, the animation module 215 generates the virtual truck 1301 driving around the city, in the area that the user is viewing, carrying content (e.g. advertisements). Since the animation module 215 has the exact geometry of the whole city and the information about the 3D objects, it can make sure that the 3D objects appear very precise.

In various embodiments, the content may be specified in many different ways, such as for example allowing the content providers (e.g. advertisers) to select different 3D objects, and place their contents on them. The content providers may also be able to create/import their own 3D objects.

In one embodiment, the content provider may be able to apply textures (e.g. images/logos) on the 3D objects and specify (e.g. via a web management tool), how the objects are supposed to move around the city. Moreover, the move can be dynamically controlled by the animation module 215 making sure that the content is visible to the end users in the best possible way.

Figure 13F:

In another embodiment, the example of FIG. 13F shows using a human avatar 1303 as a 3D object carrying the content. In various embodiments, the avatar may also guide the user towards the real world location where the advertised services can be received. For example, the avatar may carry an advertisement for a restaurant in the neighborhood and walk towards the restaurant pointing at the location to persuade the user to follow to the restaurant. Based on well knows techniques of advertising, utilizing contextual information can enable more relevant advertisement for each user. In one embodiment, a bidding system may allow advertisers to claim space in the most crowded and interesting places.

The processes described herein for providing feature-based presentation of content may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 14:
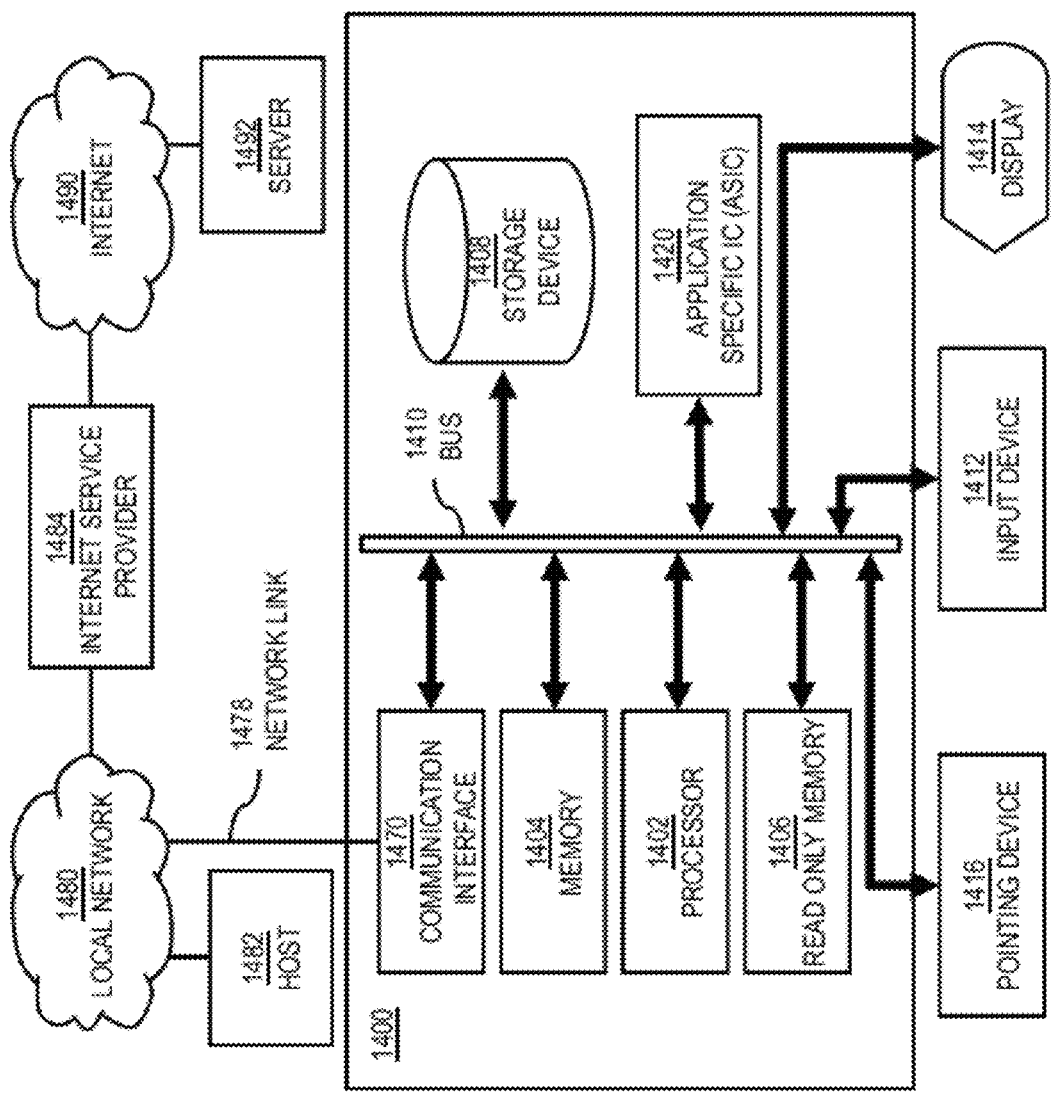
FIG. 14 is a diagram of hardware that can be used to implement an embodiment of the invention.

FIG. 14 illustrates a computer system 1400 upon which an embodiment of the invention may be implemented. Although computer system 1400 is depicted with respect to a particular device or equipment, it is contemplated that other devices or equipment (e.g., network elements, servers, etc.) within FIG. 14 can deploy the illustrated hardware and components of system 1400. Computer system 1400 is programmed (e.g., via computer program code or instructions) to provide feature-based presentation of content as described herein and includes a communication mechanism such as a bus 1410 for passing information between other internal and external components of the computer system 1400. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1400, or a portion thereof, constitutes a means for performing one or more steps of providing feature-based presentation of content.

A bus 1410 includes one or more parallel conductors of information so that information is transferred quickly among devices coupled to the bus 1410. One or more processors 1402 for processing information are coupled with the bus 1410.

A processor (or multiple processors) 1402 performs a set of operations on information as specified by computer program code related to providing feature-based presentation of content. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1410 and placing information on the bus 1410. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1402, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1400 also includes a memory 1404 coupled to bus 1410. The memory 1404, such as a random access memory (RAM) or any other dynamic storage device, stores information including processor instructions for providing feature-based presentation of content. Dynamic memory allows information stored therein to be changed by the computer system 1400. RAM allows a unit of information stored at a location called a memory address to be stored and retrieved independently of information at neighboring addresses. The memory 1404 is also used by the processor 1402 to store temporary values during execution of processor instructions. The computer system 1400 also includes a read only memory (ROM) 1406 or any other static storage device coupled to the bus 1410 for storing static information, including instructions, that is not changed by the computer system 1400. Some memory is composed of volatile storage that loses the information stored thereon when power is lost. Also coupled to bus 1410 is a non-volatile (persistent) storage device 1408, such as a magnetic disk, optical disk or flash card, for storing information, including instructions, that persists even when the computer system 1400 is turned off or otherwise loses power.

Information, including instructions for providing feature-based presentation of content, is provided to the bus 1410 for use by the processor from an external input device 1412, such as a keyboard containing alphanumeric keys operated by a human user, or a sensor. A sensor detects conditions in its vicinity and transforms those detections into physical expression compatible with the measurable phenomenon used to represent information in computer system 1400. Other external devices coupled to bus 1410, used primarily for interacting with humans, include a display device 1414, such as a cathode ray tube (CRT), a liquid crystal display (LCD), a light emitting diode (LED) display, an organic LED (OLED) display, a plasma screen, or a printer for presenting text or images, and a pointing device 1416, such as a mouse, a trackball, cursor direction keys, or a motion sensor, for controlling a position of a small cursor image presented on the display 1414 and issuing commands associated with graphical elements presented on the display 1414. In some embodiments, for example, in embodiments in which the computer system 1400 performs all functions automatically without human input, one or more of external input device 1412, display device 1414 and pointing device 1416 is omitted.

In the illustrated embodiment, special purpose hardware, such as an application specific integrated circuit (ASIC) 1420, is coupled to bus 1410. The special purpose hardware is configured to perform operations not performed by processor 1402 quickly enough for special purposes. Examples of ASICs include graphics accelerator cards for generating images for display 1414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1400 also includes one or more instances of a communications interface 1470 coupled to bus 1410. Communication interface 1470 provides a one-way or two-way communication coupling to a variety of external devices that operate with their own processors, such as printers, scanners and external disks. In general the coupling is with a network link 1478 that is connected to a local network 1480 to which a variety of external devices with their own processors are connected. For example, communication interface 1470 may be a parallel port or a serial port or a universal serial bus (USB) port on a personal computer. In some embodiments, communications interface 1470 is an integrated services digital network (ISDN) card or a digital subscriber line (DSL) card or a telephone modem that provides an information communication connection to a corresponding type of telephone line. In some embodiments, a communication interface 1470 is a cable modem that converts signals on bus 1410 into signals for a communication connection over a coaxial cable or into optical signals for a communication connection over a fiber optic cable. As another example, communications interface 1470 may be a local area network (LAN) card to provide a data communication connection to a compatible LAN, such as Ethernet. Wireless links may also be implemented. For wireless links, the communications interface 1470 sends or receives or both sends and receives electrical, acoustic or electromagnetic signals, including infrared and optical signals, that carry information streams, such as digital data. For example, in wireless handheld devices, such as mobile telephones like cell phones, the communications interface 1470 includes a radio band electromagnetic transmitter and receiver called a radio transceiver. In certain embodiments, the communications interface 1470 enables connection to the communication network 105 for providing feature-based presentation of content to the UEs 101*a*-101*n*.

The term "computer-readable medium" as used herein refers to any medium that participates in providing information to processor 1402, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1408. Volatile media include, for example, dynamic memory 1404. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1420.

Network link 1478 typically provides information communication using transmission media through one or more networks to other devices that use or process the information. For example, network link 1478 may provide a connection through local network 1480 to a host computer 1482 or to equipment 1484 operated by an Internet Service Provider (ISP). ISP equipment 1484 in turn provides data communication services through the public, world-wide packet-switching communication network of networks now commonly referred to as the Internet 1490.

A computer called a server host 1492 connected to the Internet hosts a process that provides a service in response to information received over the Internet. For example, server host 1492 hosts a process that provides information representing video data for presentation at display 1414. It is contemplated that the components of system 1400 can be deployed in various configurations within other computer systems, e.g., host 1482 and server 1492.

At least some embodiments of the invention are related to the use of computer system 1400 for implementing some or all of the techniques described herein. According to one embodiment of the invention, those techniques are performed by computer system 1400 in response to processor 1402 executing one or more sequences of one or more processor instructions contained in memory 1404. Such instructions, also called computer instructions, software and program code, may be read into memory 1404 from another computer-readable medium such as storage device 1408 or network link 1478. Execution of the sequences of instructions contained in memory 1404 causes processor 1402 to perform one or more of the method steps described herein. In alternative embodiments, hardware, such as ASIC 1420, may be used in place of or in combination with software to implement the invention. Thus, embodiments of the invention are not limited to any specific combination of hardware and software, unless otherwise explicitly stated herein.

The signals transmitted over network link 1478 and other networks through communications interface 1470, carry information to and from computer system 1400. Computer system 1400 can send and receive information, including program code, through the networks 1480, 1490 among others, through network link 1478 and communications interface 1470. In an example using the Internet 1490, a server host 1492 transmits program code for a particular application, requested by a message sent from computer 1400, through Internet 1490, ISP equipment 1484, local network 1480 and communications interface 1470. The received code may be executed by processor 1402 as it is received, or may be stored in memory 1404 or in storage device 1408 or any other non-volatile storage for later execution, or both. In this manner, computer system 1400 may obtain application program code in the form of signals on a carrier wave.

Various forms of computer readable media may be involved in carrying one or more sequence of instructions or data or both to processor 1402 for execution. For example, instructions and data may initially be carried on a magnetic disk of a remote computer such as host 1482. The remote computer loads the instructions and data into its dynamic memory and sends the instructions and data over a telephone line using a modem. A modem local to the computer system 1400 receives the instructions and data on a telephone line and uses an infra-red transmitter to convert the instructions and data to a signal on an infra-red carrier wave serving as the network link 1478. An infrared detector serving as communications interface 1470 receives the instructions and data carried in the infrared signal and places information representing the instructions and data onto bus 1410. Bus 1410 carries the information to memory 1404 from which processor 1402 retrieves and executes the instructions using some of the data sent with the instructions. The instructions and data received in memory 1404 may optionally be stored on storage device 1408, either before or after execution by the processor 1402.

FIG. 15 illustrates a chip set or chip 1500 upon which an embodiment of the invention may be implemented. Chip set 1500 is programmed to provide feature-based presentation of content as described herein and includes, for instance, the processor and memory components described with respect to FIG. 14 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1500 can be implemented in a single chip. It is further contemplated that in certain embodiments the chip set or chip 1500 can be implemented as a single "system on a chip." It is further contemplated that in certain embodiments a separate ASIC would not be used, for example, and that all relevant functions as disclosed herein would be performed by a processor or processors. Chip set or chip 1500, or a portion thereof, constitutes a means for performing one or more steps of providing user interface navigation information associated with the availability of functions. Chip set or chip 1500, or a portion thereof, constitutes a means for performing one or more steps of providing feature-based presentation of content.

In one embodiment, the chip set or chip 1500 includes a communication mechanism such as a bus 1501 for passing information among the components of the chip set 1500. A processor 1503 has connectivity to the bus 1501 to execute instructions and process information stored in, for example, a memory 1505. The processor 1503 may include one or more processing cores with each core configured to perform independently. A multi-core processor enables multiprocessing within a single physical package. Examples of a multi-core processor include two, four, eight, or greater numbers of processing cores. Alternatively or in addition, the processor 1503 may include one or more microprocessors configured in tandem via the bus 1501 to enable independent execution of instructions, pipelining, and multithreading. The processor 1503 may also be accompanied with one or more specialized components to perform certain processing functions and tasks such as one or more digital signal processors (DSP) 1507, or one or more application-specific integrated circuits (ASIC) 1509. A DSP 1507 typically is configured to process real-world signals (e.g., sound) in real time independently of the processor 1503. Similarly, an ASIC 1509 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1500 includes merely one or more processors and some software and/or firmware supporting and/or relating to and/or for the one or more processors.

The processor 1503 and accompanying components have connectivity to the memory 1505 via the bus 1501. The memory 1505 includes both dynamic memory (e.g., RAM, magnetic disk, writable optical disk, etc.) and static memory (e.g., ROM, CD-ROM, etc.) for storing executable instructions that when executed perform the inventive steps described herein to provide feature-based presentation of content. The memory 1505 also stores the data associated with or generated by the execution of the inventive steps.

Figure 16:
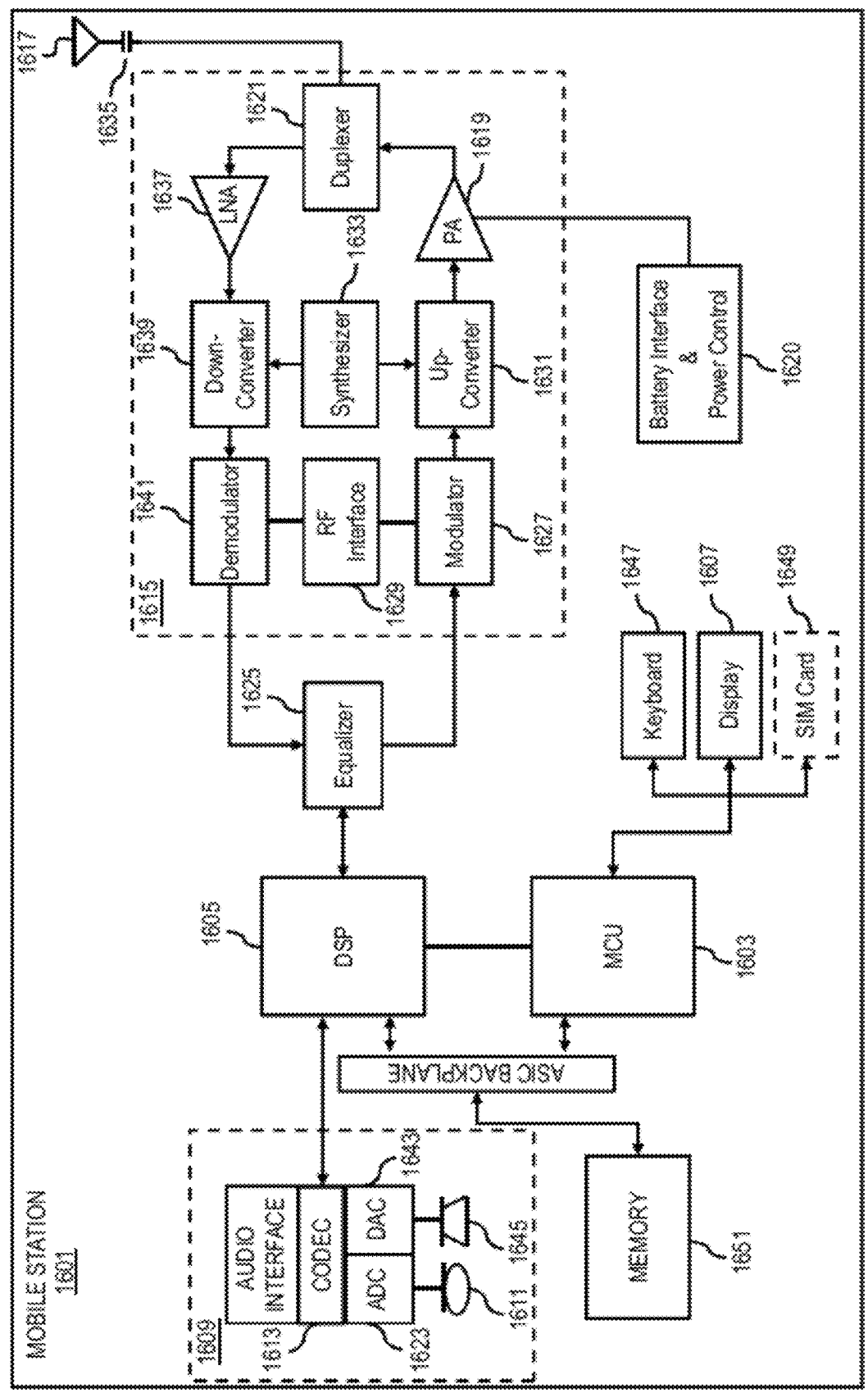
FIG. 16 is a diagram of a mobile terminal (e.g., handset) that can be used to implement an embodiment of the invention.

FIG. 16 is a diagram of exemplary components of a mobile terminal (e.g., handset) for communications, which is capable of operating in the system of FIG. 1, according to one embodiment. In some embodiments, mobile terminal 1601, or a portion thereof, constitutes a means for performing one or more steps of providing feature-based presentation of content. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1603, a Digital Signal Processor (DSP) 1605, and a receiver/transmitter unit including a microphone gain control unit and a speaker gain control unit. A main display unit 1607 provides a display to the user in support of various applications and mobile terminal functions that perform or support the steps of providing feature-based presentation of content. The display 1607 includes display circuitry configured to display at least a portion of a user interface of the mobile terminal (e.g., mobile telephone). Additionally, the display 1607 and display circuitry are configured to facilitate user control of at least some functions of the mobile terminal. An audio function circuitry 1609 includes a microphone 1611 and microphone amplifier that amplifies the speech signal output from the microphone 1611. The amplified speech signal output from the microphone 1611 is fed to a coder/decoder (CODEC) 1613.

A radio section 1615 amplifies power and converts frequency in order to communicate with a base station, which is included in a mobile communication system, via antenna 1617. The power amplifier (PA) 1619 and the transmitter/modulation circuitry are operationally responsive to the MCU 1603, with an output from the PA 1619 coupled to the duplexer 1621 or circulator or antenna switch, as known in the art. The PA 1619 also couples to a battery interface and power control unit 1620.

In use, a user of mobile terminal 1601 speaks into the microphone 1611 and his or her voice along with any detected background noise is converted into an analog voltage. The analog voltage is then converted into a digital signal through the Analog to Digital Converter (ADC) 1623. The control unit 1603 routes the digital signal into the DSP 1605 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1625 for compensation of any frequency-dependent impairments that occur during transmission though the air such as phase and amplitude distortion. After equalizing the bit stream, the modulator 1627 combines the signal with a RF signal generated in the RF interface 1629. The modulator 1627 generates a sine wave by way of frequency or phase modulation. In order to prepare the signal for transmission, an up-converter 1631 combines the sine wave output from the modulator 1627 with another sine wave generated by a synthesizer 1633 to achieve the desired frequency of transmission. The signal is then sent through a PA 1619 to increase the signal to an appropriate power level. In practical systems, the PA 1619 acts as a variable gain amplifier whose gain is controlled by the DSP 1605 from information received from a network base station. The signal is then filtered within the duplexer 1621 and optionally sent to an antenna coupler 1635 to match impedances to provide maximum power transfer. Finally, the signal is transmitted via antenna 1617 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1601 are received via antenna 1617 and immediately amplified by a low noise amplifier (LNA) 1637. A down-converter 1639 lowers the carrier frequency while the demodulator 1641 strips away the RF leaving only a digital bit stream. The signal then goes through the equalizer 1625 and is processed by the DSP 1605. A Digital to Analog Converter (DAC) 1643 converts the signal and the resulting output is transmitted to the user through the speaker 1645, all under control of a Main Control Unit (MCU) 1603 which can be implemented as a Central Processing Unit (CPU) (not shown).

The MCU 1603 receives various signals including input signals from the keyboard 1647. The keyboard 1647 and/or the MCU 1603 in combination with other user input components (e.g., the microphone 1611) comprise a user interface circuitry for managing user input. The MCU 1603 runs a user interface software to facilitate user control of at least some functions of the mobile terminal 1601 to provide feature-based presentation of content. The MCU 1603 also delivers a display command and a switch command to the display 1607 and to the speech output switching controller, respectively. Further, the MCU 1603 exchanges information with the DSP 1605 and can access an optionally incorporated SIM card 1649 and a memory 1651. In addition, the MCU 1603 executes various control functions required of the terminal. The DSP 1605 may, depending upon the implementation, perform any of a variety of conventional digital processing functions on the voice signals. Additionally, DSP 1605 determines the background noise level of the local environment from the signals detected by microphone 1611 and sets the gain of microphone 1611 to a level selected to compensate for the natural tendency of the user of the mobile terminal 1601.

The CODEC 1613 includes the ADC 1623 and DAC 1643. The memory 1651 stores various data including call incoming tone data and is capable of storing other data including music data received via, e.g., the global Internet. The software module could reside in RAM memory, flash memory, registers, or any other form of writable storage medium known in the art. The memory device 1651 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1649 carries, for instance, important information, such as the cellular phone number, the carrier supplying service, subscription details, and security information. The SIM card 1649 serves primarily to identify the mobile terminal 1601 on a radio network. The card 1649 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
    one or more representations of at least one structure, wherein the one or more representations are associated with a plurality of views from different perspectives of the at least one structure;
    a processing of the one or more representations to determine one or more features of the one or more representations;
    a designation of the one or more features as elements of a virtual display area, wherein the one or more representations comprise, at least in part, the virtual display area;
    a presentation of one or more outputs of one or more applications, one or more services, or a combination thereof in the virtual display area;
    a rendering of an environment including, at least in part, the one or more representations, one or more other representations, the one or more features, the virtual display area, the presentation of the one or more outputs, or a combination thereof;
    a determination of one or more areas of the rendered environment including, at least in part, a rendering of a visual artifact in the rendered environment,
        wherein the visual artifact is based on at least one virtual moving object or a rendering inconsistency in the one or more representations,
        wherein the rendering inconsistency is based on a distortion associated with the plurality of views from the different perspectives of the at least one structure; and
    a presentation of at least a portion of the one or more outputs, one or more other outputs, or a combination thereof in the one or more areas with the visual artifact concealed under an advertisement.

2. A method of claim 1, wherein the visual artifact is based on the at least one virtual moving object, wherein the at least one virtual moving object appears in a predetermined location on a predetermined path in the presentation.

3. A method of claim 1, wherein the (1) data and/or (2) information and/or (3) at least one signal are further based, at least in part, on the following:
    at least one determination to modify one or more rendering characteristics of the one or more features to generate the presentation of the one or more outputs,
    wherein the one or more characteristics include, at least in part, a lighting characteristic, a color, a bitmap overlay, or a combination thereof,
    wherein the one or more features represent, at least in part, one or more windows, one or more doors, one or more architectural features, or a combination thereof of the at least one structure.

4. A method of claim 1, wherein the (1) data and/or (2) information and/or (3) at least one signal are further based, at least in part, on the following:
    an input for specifying one or more policies associated with the at least one structure, the one or more representations, the one or more features, or a combination thereof,
    wherein the presentation of the one or more outputs is based, at least in part, on the one or more policies.

5. A method of claim 4, wherein the one or more outputs relate, at least in part, to advertising information, and wherein the one or more policies relate to a type of information to display, an extent of the virtual display area to allocate to the one or more outputs, pricing information, or a combination thereof.

6. A method of claim 5, wherein the one or more policies relate to permission rights of users to use of a virtual display area, based, at least in part, on ownership of the at least one structure.

7. A method of claim 1, wherein the (1) data and/or (2) information and/or (3) at least one signal are further based, at least in part, on the following:
    a processing of one or more renderings of the virtual display area, the one or more representations, the one or more features, or a combination thereof to depict a night mode, a day mode, a time of day, a theme, an environmental condition, or a combination thereof.

8. A method of claim 1, wherein the (1) data and/or (2) information and/or (3) at least one signal are further based, at least in part, on the following:
    one or more other representations of one or more objects;
    a rendering of the environment in which the one or more other representations interact with the one or more representations, the one or more features, the virtual display area, the presentation of the one or more outputs, or a combination thereof.

9. A method of claim 8, wherein the (1) data and/or (2) information and/or (3) at least one signal are further based, at least in part, on the following:
  a presentation of at least a portion of the one or more outputs, one or more other outputs, or a combination thereof, on the one or more other representations of the one or more objects.

10. A method of claim 8, wherein the (1) data and/or (2) information and/or (3) at least one signal are further based, at least in part, on the following:
  at least one determination to generate at least one animation including the one or more other representations of the one or more objects,
    wherein the rendering of the environment includes, at least in part, the at least one animation, and
    wherein the animation relates, at least in part, to advertising information, navigation information, or a combination thereof.

11. A method of claim 1, wherein the (1) data and/or (2) information and/or (3) at least one signal are further based, at least in part, on the following:
  an input for specifying one or more policies associated with other unwanted objects;
  wherein the one or more policies are based, at least in part, on the type of objects, objects owner, or combination thereof.

12. A method of claim 1, wherein the visual artifact is moving, changing, or a combination thereof through the virtual display area and the presentation of the advertisement respectively moves, changes, or a combination thereof to continually conceal the visual artifact.

13. An apparatus comprising:
  at least one processor; and
  at least one memory including computer program code for one or more programs,
  the at least one memory and the computer program code configured to, with the at least one processor, cause the apparatus to perform at least the following,
    determine one or more representations of at least one structure,
      wherein the one or more representations are associated with a plurality of views from different perspectives of the at least one structure,
    process and/or facilitate a processing of the one or more representations to determine one or more features of the one or more representations,
    cause, at least in part, designation of the one or more features as elements of a virtual display area, wherein the one or more representations comprise, at least in part, the virtual display area,
    cause, at least in part, presentation of one or more outputs of one or more applications, one or more services, or a combination thereof in the virtual display area,
    cause, at least in part, rendering of an environment including, at least in part, the one or more representations, one or more other representations, the one or more features, the virtual display area, the presentation of the one or more outputs, or a combination thereof,
    determine one or more areas of the rendered environment including, at least in part, a rendering of a visual artifact in the rendered environment,
    wherein the visual artifact is based on at least one virtual moving object or a rendering inconsistency in the one or more representations,
      wherein the rendering inconsistency is based on a distortion associated with the plurality of views from the different perspectives of the at least one structure, and
    cause, at least in part, presentation of at least a portion of the one or more outputs, one or more other outputs, or a combination thereof in the one or more areas with the visual artifact concealed under an advertisement.

14. An apparatus of claim 13, wherein the visual artifact is based on the at least one virtual moving object, wherein the at least one virtual moving object appears in a predetermined location on a predetermined path in the presentation.

15. An apparatus of claim 13, wherein the apparatus is further caused to:
  determine to modify one or more rendering characteristics of the one or more features to generate the presentation of the one or more outputs,
    wherein the one or more characteristics include, at least in part, a lighting characteristic, a color, a bitmap overlay, or a combination thereof,
    wherein the one or more features represent, at least in part, one or more windows, one or more doors, one or more architectural features, or a combination thereof of the at least one structure.

16. An apparatus of claim 13, wherein the apparatus is further caused to:
  receive an input for specifying one or more policies associated with the at least one structure, the one or more representations, the one or more features, or a combination thereof, wherein the presentation of the one or more outputs is based, at least in part, on the one or more policies.

17. An apparatus of claim 16, wherein the one or more outputs relate, at least in part, to advertising information, and wherein the one or more policies relate to a type of information to display, an extent of the virtual display area to allocate to the one or more outputs, pricing information, or a combination thereof.

18. An apparatus of claim 13, wherein the apparatus is further caused to:
  process and/or facilitate a processing of one or more renderings of the virtual display area, the one or more representations, the one or more features, or a combination thereof to depict a night mode, a day mode, a time of day, a theme, an environmental condition, or a combination thereof.

19. An apparatus of claim 13, wherein the apparatus is further caused to:
  determine one or more other representations of one or more objects,
  cause, at least in part, rendering of the environment in which the one or more other representations interact with the one or more representations, the one or more features, the virtual display area, the presentation of the one or more outputs, or a combination thereof.

20. An apparatus of claim 19, wherein the apparatus is further caused to:
  cause, at least in part, presentation of at least a portion of the one or more outputs, one or more other outputs, or a combination thereof, on the one or more other representations of the one or more objects.

21. An apparatus of claim 19, wherein the apparatus is further caused to:
  determine to generate at least one animation including the one or more other representations of the one or more objects, wherein the rendering of the environment includes, at least in part, the at least one animation, and wherein the animation relates, at least in part, to advertising information, navigation information, or a combination thereof.

* * * * *